(12) United States Patent
Hosaki et al.

(10) Patent No.: US 8,213,727 B2
(45) Date of Patent: Jul. 3, 2012

(54) IMAGE ENCODING APPARATUS AND IMAGE DECODING APPARATUS, AND CONTROL METHOD THEREOF

(75) Inventors: Kenta Hosaki, Tokyo (JP); Hisashi Ishikawa, Urayasu (JP); Michiaki Takasaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1049 days.

(21) Appl. No.: 12/142,314

(22) Filed: Jun. 19, 2008

(65) Prior Publication Data

US 2008/0317362 A1    Dec. 25, 2008

(30) Foreign Application Priority Data

Jun. 20, 2007  (JP) .................... 2007-163015
Jun. 20, 2007  (JP) .................... 2007-163016

(51) Int. Cl.
*G06K 9/36* (2006.01)
(52) U.S. Cl. ...................... 382/232; 382/166
(58) Field of Classification Search .......... 382/232–253, 382/166; 358/1.9, 1.2, 539, 426.01–426.16; 375/240.01–240.26
See application file for complete search history.

(56) References Cited

U.S. PATENT DOCUMENTS

| 6,252,992 | B1 | 6/2001 | Ishikawa ...................... 382/239 |
| 6,658,146 | B1 * | 12/2003 | Iourcha et al. ................ 382/166 |
| 7,903,888 | B2 * | 3/2011 | Tsutsumi et al. ............. 382/232 |
| 2008/0037883 | A1 | 2/2008 | Tsutsumi et al. ............. 382/232 |
| 2008/0095455 | A1 | 4/2008 | Hosaki .......................... 382/248 |
| 2009/0285479 | A1 * | 11/2009 | Hosaki .......................... 382/166 |

FOREIGN PATENT DOCUMENTS

JP          05-056282        3/1993

* cited by examiner

*Primary Examiner* — Ishrat I Sherali
(74) *Attorney, Agent, or Firm* — Fitzpatrick, Cella, Harper & Scinto

(57) ABSTRACT

An image encoding apparatus generate encoded data having a fixed length L which is less than or equal to m×n bits and an integral multiple of 32 by m×n pixel block, while resolution information and color information are excellently maintained. For this purpose, a block generation unit inputs image data by m×n pixels. A 2-color extraction unit extracts representative colors C0 and C1 from the input block image data. An identification information detection unit generates m×n items of identification information each identifying each pixel in the block as a pixel approximate to one of the colors C0 and C1. An identification information deletion unit deletes the items of identification information in corresponding positions based on a deletion pattern stored in a deletion pattern memory. A packing unit packs the colors C0, C1 and the identification information after deletion, and outputs the data as encoded data.

29 Claims, 15 Drawing Sheets

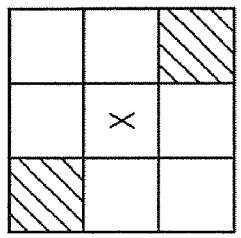
FIG. 5A
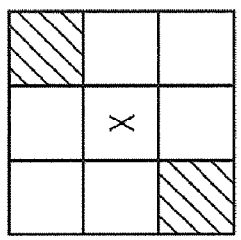
FIG. 5B
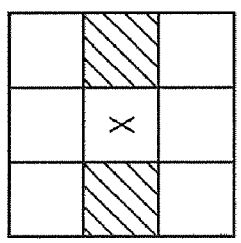
FIG. 5C
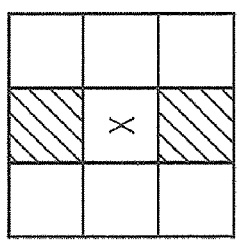
FIG. 5D
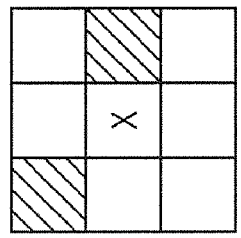
FIG. 5E
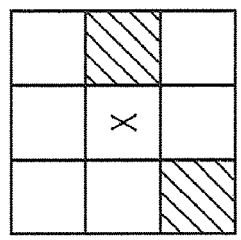
FIG. 5F
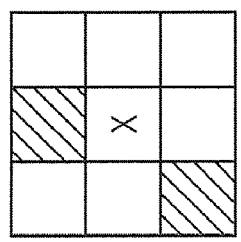
FIG. 5G
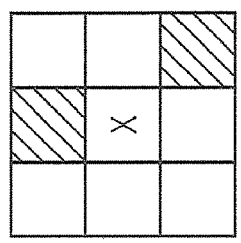
FIG. 5H
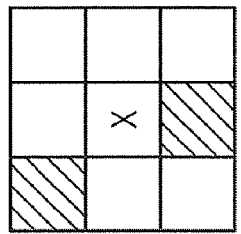
FIG. 5I
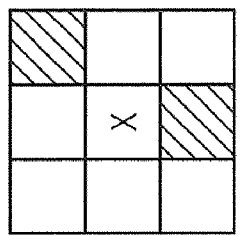
FIG. 5J
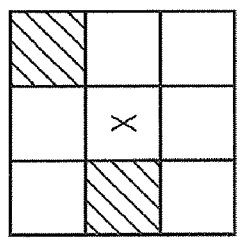
FIG. 5K
FIG. 5L

DELETION PATTERN 0

DELETION PATTERN 1

DELETION PATTERN 2

DELETION PATTERN 3

DELETION PATTERN 0

DELETION PATTERN 1

DELETION PATTERN 2

DELETION PATTERN 3

FIG. 16A

BIT 0 OF C1 IS "0"

| CODING TYPE INFORMATION | BIT 0 OF C0 | BIT 1 TO 7 OF C1 | BIT 1 TO 7 OF C0 | IDENTIFICATION INFORMATION |
|---|---|---|---|---|
| 1 | 1 | 7 | 7 | 64 |

NUMBER OF BITS

FIG. 16B

BIT 0 OF C1 IS "1"

| CODING TYPE INFORMATION | BIT 0 OF C0 | BIT 1 TO 7 OF C1 | BIT 1 TO 7 OF C0 | IDENTIFICATION INFORMATION |
|---|---|---|---|---|
| 1 | 1 | 7 | 7 | 64 |

NUMBER OF BITS

IMAGE ENCODING APPARATUS AND IMAGE DECODING APPARATUS, AND CONTROL METHOD THEREOF

BACKGROUND OF THE INVENTION

1. Field of the Invention

The present invention relates to an image data encoding and decoding technique.

2. Description of the Related Art

Conventionally, a technique of dividing an input image into predetermined sized blocks and encoding the divided image blocks using an orthogonal transformation is known. The encoding using orthogonal transformation is effective compression for natural images (continuous tone image). On the other hand, for images including a character or line-art image and the like (hereinbelow, text image), "mosquito noise" and block distortion occur due to loss of image high frequency components, and excellent results cannot be obtained.

To solve this problem, intra-block 2-color processing is proposed. In this processing, in an image where resolution is more important than tonality such as an image including a character/line-art portion, the resolution is maintained by approximation of pixels in image blocks to 2 colors. Japanese Patent Application Laid-Open No. Hei 05-056282 disclosing execution of the 2 color processing is known. In the 2 gray-level block approximation encoding disclosed in the document, the pixels in a block image are regarded as a 2-color image, and identification information is generated to identify each pixel as one of these 2 colors. Then, the identification information and 2 color pixel values are packed, thereby encoding processing is performed. For example, when image data of 8×8 pixel-sized block is 2-color processed and encoded, all the 64 bit data are stored as identification information, then as color data, 8 bit data is stored for 2 colors, and total 80-bit fixed-length encoded data is outputted. Similarly, when 16×16 pixel-sized block image data is encoded, the identification information is 256 bits, and the color data is 8 bits×2=16 bits. In this case, total 272 bit fixed-length encoded data is outputted.

Generally, compressed data is stored in an external memory or the like, however, access to the external memory is often made with 4 bytes×N (where N is a power of 2). In the above related art, access efficiency is low. For example, regarding the above-described 8×8 block size, 64 bits is desirable. Further, regarding the above-described 16×16 block size, 256-bit fixed-length encoding is desirable.

SUMMARY OF THE INVENTION

The present invention provides a technique for generating encoded data having a fixed length which is less than or equal to m×n bits and an integral multiple of 32, by m×n pixel block, with high efficiency in storage and transfer, while excellently maintaining resolution information representing a text image and color information.

Further, the present invention provides a technique for further reducing the amount of encoded data for an entire image by encoding 1 block encoded data to data with smaller number of bits. Further, in addition to the above-described techniques, the present invention proposes a technique for generating encoded data in which the number of bits is an integral multiple of 1 byte for the sake of convenience of access with an electronic device, a computer program or the like.

According to the present invention, an image encoding apparatus is provided for encoding plural block data each having m×n pixels, in multi-valued image data, and generating L-bit (L≦m×n) encoded data for each block data, comprising: an input unit to input the block data; an extraction unit to extract plural representative color information from the input block data; a generation unit to generate identification information for identification of each pixel in the block data as a pixel corresponding to one of the plural representative color information; and a deletion unit to refer to predetermined pattern data and to delete the identification information by a number of bits obtained by subtracting the L bits from a total number of bits of the plural representative color information and encoded data constituted by the identification information.

Further, provided is an image encoding apparatus for encoding image data in which 1 pixel is represented with plural bits by m×n pixel block, and generating encoded data having a fixed length L which is less than or equal to m×n bits and an integral multiple of at least 32, for 1 block, comprising: an input unit to input image data by the block; an extraction unit to extract representative colors C0 and C1 from image data of the input block of interest; a generation unit to generate 1-bit identification information to identify each pixel in the block of interest as a pixel approximate to one of the representative colors C0 and C1; a storage unit to, when a number of bits necessary to specify at least the representative colors C0 and C1 is defined as N, hold pattern data for deletion of {m×n−L+N} items of identification information from the identification information for 1 block generated by the generation unit and for specifying pixel positions to be deleted away from each other by at least 1 pixel; a deletion unit to refer to the pattern data held in the storage unit and to delete the {m×n−L+N} items of identification information from m×n bit identification information generated by the generation unit, thereby generate L−N bit identification information; and an output unit to combine N bits including information to specify the representative colors C0 and C1 extracted by the extraction unit to the {L−N} bit identification information after deletion by the deletion unit, and output the result of combining as encoded data for the block of interest.

According to the present invention, fixed-length encoded data can be generated in m×n pixel block units while resolution information representing a character or line art image and color information can be excellently maintained. Further, according to the present invention, encoded data having a fixed length which is less than or equal to m×n bits and is an integral multiple of 32 can be generated with high efficiency in storage and transfer.

Further features of the present invention will become apparent from the following description of exemplary embodiments with reference to the attached drawings.

BRIEF DESCRIPTION OF THE DRAWINGS

FIGS. 5A to 5L illustrate reference patterns used in decoding by the image decoding apparatus;

FIGS. 16A and 16B illustrate data structures of encoded data generated by the 2-color encoding unit;

DESCRIPTION OF THE EMBODIMENTS

Hereinbelow, embodiments of the present invention will be described in detail in accordance with the attached drawings.

Generally, the number of bits of a data bus inside a computer and other electronic devices is an integral multiple of 32. Accordingly, upon access to compressed data, the size of the compressed data is desirably an integral multiple of the data bus. In the present embodiment, image data in which 1 pixel is represented with plural bits is encoded by an m×n pixel block. Then L-bit fixed-length encoded data is generated from 1-block image data. Note that the fixed length L is less than or equal to m×n bits and is an integral multiple of 32 (its maximum value is desirable). Further, in an apparatus of the present embodiment, 2 representative colors are extracted from 1 block. Then, assuming that the number of bits to represent the 2 colors is N, fixed-length L encoded data is generated for the 1 block with the N bits and L−N bit identification information. In the present embodiment, as a particular example, 1 pixel is represented with 8 bits, the size of 1 block is 16×16 pixels, and encoded data with the fixed length L=256 bits is generated. Further, as described below, an image to be encoded in the present embodiment is preferably a character or line art image. A typical character or line art image is best thought of as text comprising a standard sentence of text.

First Embodiment

Figure 1:
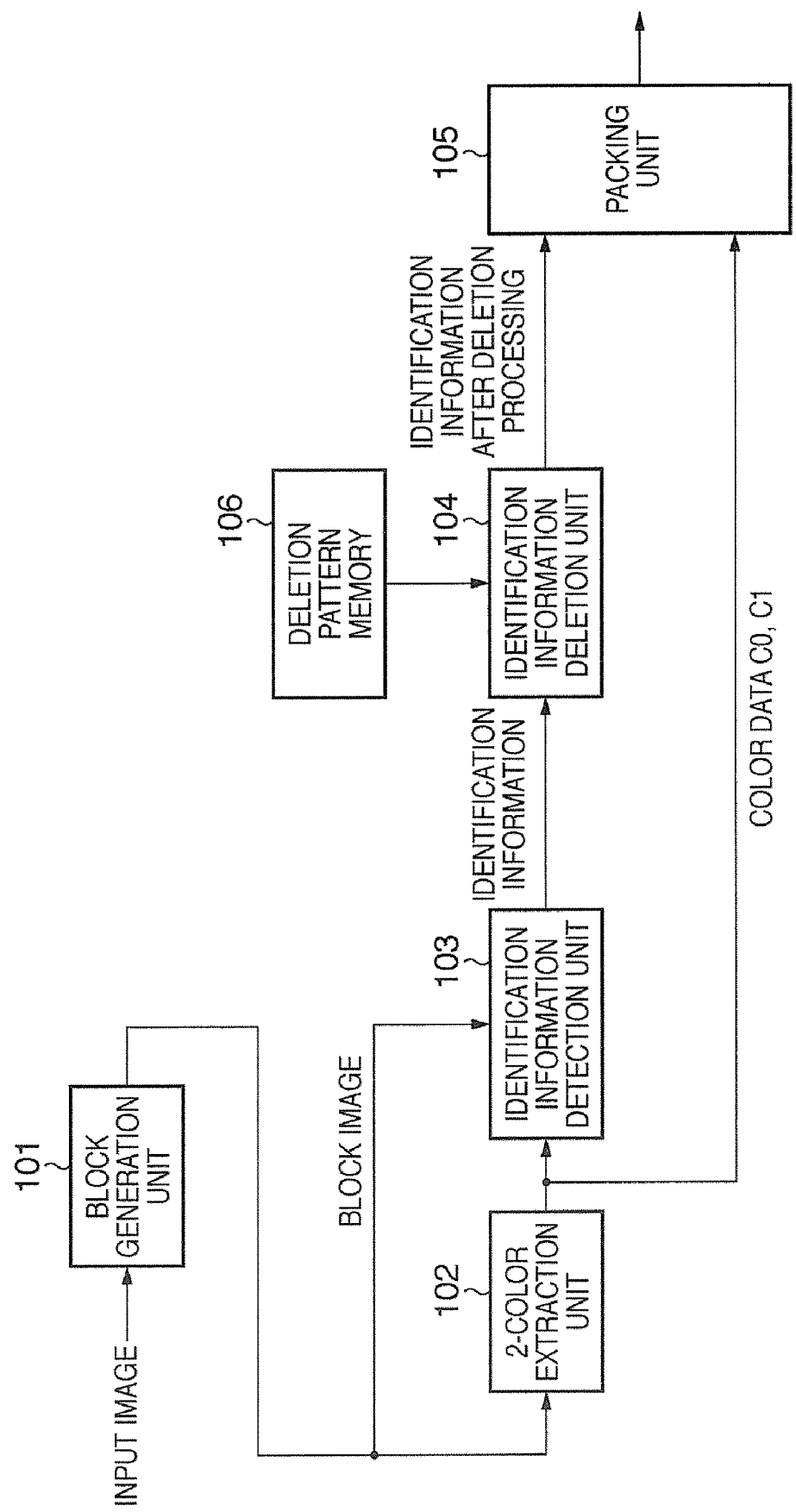
FIG. 1 is a block diagram of an image encoding apparatus according to a first embodiment of the present invention.

FIG. 1 is a block diagram of an image encoding apparatus according to a first embodiment of the present invention. The image encoding apparatus has a block generation unit 101, a 2-color extraction unit 102, an identification information detection unit 103, an identification information deletion unit 104, a packing unit 105, and a deletion pattern memory 106. Note that image data to be encoded, which is inputted by the block generation unit 101, is an image read from an image scanner. However, the image data may be obtained from a storage medium holding uncompressed image data as a file, or may be obtained by communication (e.g., from a network). That is, the image data may be obtained from any type of input source.

The block generation unit 101 divides an input image into predetermined-sized blocks (16×16 pixel size in the embodiment). The block image data are supplied to the 2-color extraction unit 102. The 2-color extraction unit 102 analyzes respective pixel values in an input block of interest, and extracts 2 representative colors (or representative values) C0 and C1. Then the 2-color extraction unit 102 outputs the extracted representative colors C0 and C1 to the identification information detection unit 103 and the packing unit 105. The identification information detection unit 103 determines whether each pixel in the block is approximate to the color data C0 or C1, and by each pixel position, outputs identification information for identification as a pixel approximate to color data C0 or C1 to the identification information deletion unit 104.

The identification information deletion unit 104 deletes the identification information in predetermined positions, and outputs the information to the packing unit 105. The packing unit 105 packs the 2 color data C0 and C1 and the deletion-processed identification information, and outputs as fixed-length encoded data. Hereinbelow, the details of the respective processing units will be described.

The size of block inputted by the block generation unit 101 is not particularly limited. In a case where the block size is large, even when the number of deletion positions of identification information is increased, the influence by the deletion is reduced, however, the influence by the 2 color extraction is increased. On the other hand, in a case where the block size is small, as the number of colors included in an input image block is small by correlation of the image, the error due to the 2 color extraction is reduced and storage of accurate color can be facilitated. However, the influence due to the deletion of identification information is increased. Further, the shape of block is not necessarily square but may be rectangle. In the present embodiment, as described above, the size of 1 block is 16×16 pixels. The size may be appropriately set by a user. Further, image data to be encoded is a monochrome image in which 1 pixel is represented with 8 bits, however, the number of bits and color space may be appropriately changed. For example, it may be arranged such that even in an image in which 1 pixel is represented with 8 bits, a G component is represented with 4 bits, an R component, with 2 bits, and B component, 2 bits.

The block generation unit 101 divides an input image into 16×16 pixel blocks, and outputs the respective block image data to the 2-color extraction unit 102 and the identification information detection unit 103.

The 2-color extraction unit 102 extracts 2 representative color data, C0 and C1 from the input 1 block. Note that in this embodiment, the color data having a smaller pixel value is the color data C0, and the color data having a larger pixel value, the color data C1. The determination (extraction) of the 2 color data C0 and C1 is not particularly limited, however, as an example, the determination is made as follows.

First, the 2-color extraction unit 102 calculates an average value AVE of all the pixels in 1 block. Assuming that the pixel value of a coordinates (x, y) in the block is represented as P(x, y), the average value AVE is obtained as follows.

$$AVE = \Sigma\Sigma P(i,j)/(16 \times 16)$$

$\Sigma\Sigma$ is addition of i, j=0, 1, . . . , 15.

Next, the 2-color extraction unit 102 classifies the respective pixels in the block of interest into first group and second group using the average value AVE. That is, the 2-color extraction unit 102 classifies the pixels into a pixel group having pixel values less than or equal to the average value AVE (hereinbelow, group A) and a pixel group having pixel values greater than the average value AVE (hereinbelow, group B). Then the 2-color extraction unit 102 determines an average value of the pixel values belonging to the group A as color data C0, and an average value of the pixel values belonging to the group B as color data C1.

The identification information detection unit 103 determines whether each pixel in the input block image is approximate to the color data C0 or C1. Then, the identification information detection unit 103 classifies all the pixels in the block into 2 groups, and outputs identification information for identification of each pixel as a pixel belonging to one of the 2 groups. The identification information per pixel is 1 bit since identification information is used for identification of each pixel as a pixel belonging to one of the 2 groups. More particularly, the identification information detection unit 103 generates the identification information as follows.
Threshold=AVE (average value of pixels in a block)
Identification information=1 (when pixel value>threshold holds)
Identification information=0 (when pixel value≦threshold holds)

Note that the threshold may be calculated by the identification information detection unit 103 in its own right, or the result of calculation by the 2-color extraction unit 102 may be utilized. Further, {C0+C1}/2 may be used as the threshold.

In the present embodiment, the identification information of pixels belonging to the above-described group A is "0", while the identification information of pixels belonging to the group B is "1".

Further, the above processing is performed when the absolute value of the difference between the color data C0 and C1 is greater than or equal to a predetermined threshold. When the absolute value of the difference between the color data C0 and C1 is less than the predetermined threshold (e.g., all the pixel values in a block of interest are the same, that is, when the distance between the color data C0 and C1 in color space is less than the threshold, only one color data (e.g., C0) is determined as the result of extraction. In this case, the other color data (C1) does not exist, but the color data (C1) is generated as dummy data. Then the identification information is all "0".

In the present embodiment, the size of one block is 16×16 pixels, and the identification information for 1 pixel is 1 bit. At last, the identification information detection unit 103 generates 16×16=256 bit identification information.

The identification information deletion unit 104 refers to deletion pattern data (simply referred to as a "deletion pattern") stored in the deletion pattern memory 106, and deletes one or more items of identification information from the 256 bit identification information generated as above. Then the identification information deletion unit 104 outputs the deletion-processed identification information to the packing unit 105.

In this example, the packing unit 105 outputs encoded data with fixed length bits "256" for 1 block. As the color data C0 and C1 are both 8-bit data, the 2 color data are represented with 16 bits. Accordingly, it is necessary for the identification information deletion unit 104 to delete the identification information for 16 pixels.

Figure 2:
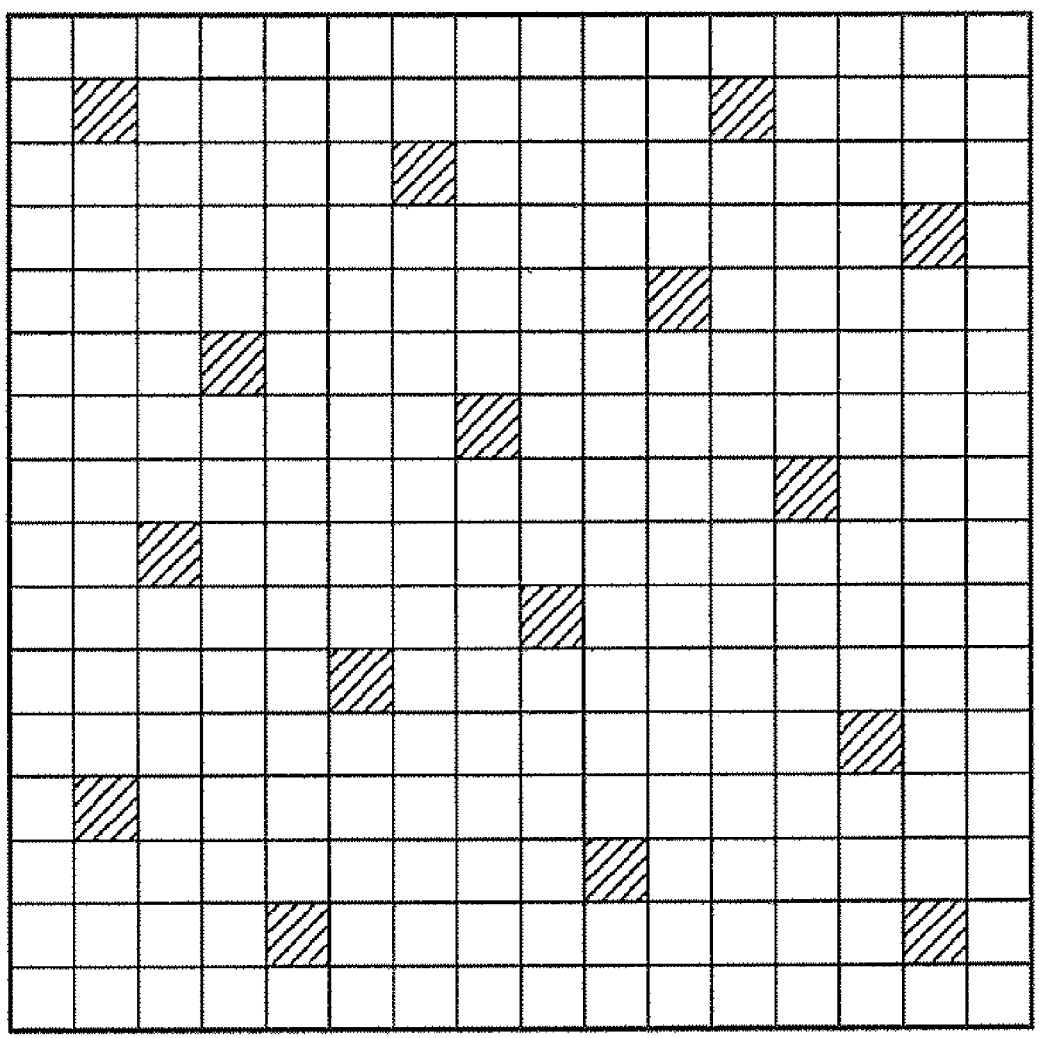
FIG. 2 is an example of a deletion pattern in the first embodiment.

The deletion pattern memory 106 of the present embodiment holds a deletion pattern having a size of 16×16 pixels (the same size as the unit of encoding) as shown in FIG. 2. The identification information deletion unit 104 deletes the identification information using the deletion pattern. In FIG. 2, the deletion pattern is represented with black and white portions, however, the deletion pattern actually is a "0" and "1" binary pattern. In this case, a white portion indicates "0", and a black portion, "1". The black portion ("1" portion) indicates a deletion position. The number of the black portions is 16. Accordingly, 16 items of identification information, in other words, 16-bit identification information is deleted. Note that the details of deletion using the deletion pattern in FIG. 2 will be described later.

More particular deletion processing by the identification information deletion unit 104 is as follows. In this example, each of 16×16 items of identification information is represented as I(x, y) using the coordinates (x, y), and the value of coordinates (x, y) in the deletion pattern is represented as D(x, y).

The identification information deletion unit 104 sequentially inputs the identification information in the order of raster scanning, and performs deletion and output of the identification information under the following conditions.

When D(x, y)=0 holds, the input I(x, y) is outputted without any change.

When D(x, y)=1 holds, the input I(x, y) is deleted and not outputted.

As a result, the identification information is not outputted in the position where D(x, y)=1 holds. That is, 16 (16 bits) items of identification information are deleted. As a result, the number of bits of the identification information outputted from the identification information deletion unit 104 to the packing unit 105 is 240.

The packing unit 105 first holds the color data C0 and C1 (8×2 bits) outputted from the 2-color extraction unit 102 in the order of output, then combines the 240-bit identification information from the identification information deletion unit 104 as trailing data to the color data, and outputs the combined data as 1 block encoded data.

In the present embodiment, basically, in the deletion pattern shown in FIG. 2, 1 deletion position exists in 1 line and 1 column. That is, the pixels to be deleted are dispersed in the line and column directions. Note that for the sake of simplification of interpolation algorithm to be described later, data positioned on the border of the block is not deleted. Accordingly, as shown in the figure, 2 deletion positions exist in several lines and columns.

Next, the deletion pattern in the present embodiment will be described in more detail. In the case of text image (character or line art image), basically, 2 types of colors are used as a background color and a color of pixels of text image. A typical example is a black text image on a white background. However, the value of a white pixel is not always "255" and the value of a black pixels is not always "0" due to the influence of scanner precision or the like. The white and black pixels often have different values within an appropriate range. In this point, according to the present embodiment, as the values are approximated to 2 colors by the 2-color extraction unit 102, the influence of scanner precision or the like can be ignored.

In this embodiment, attention should be paid to the fact that probability of occurrence of horizontal and vertical lines is far higher that of diagonal lines. Accordingly, it is desirable that the number of positions to delete the identification information is small in 1 line or column. In the present embodiment, as shown in FIG. 2, basically, the number of deletion position is 1 in 1 line and 1 column. Note that the reason for saving the identification information positioned on the border of the block will be given from the description of decoding as follows.

Figures 3, 4:
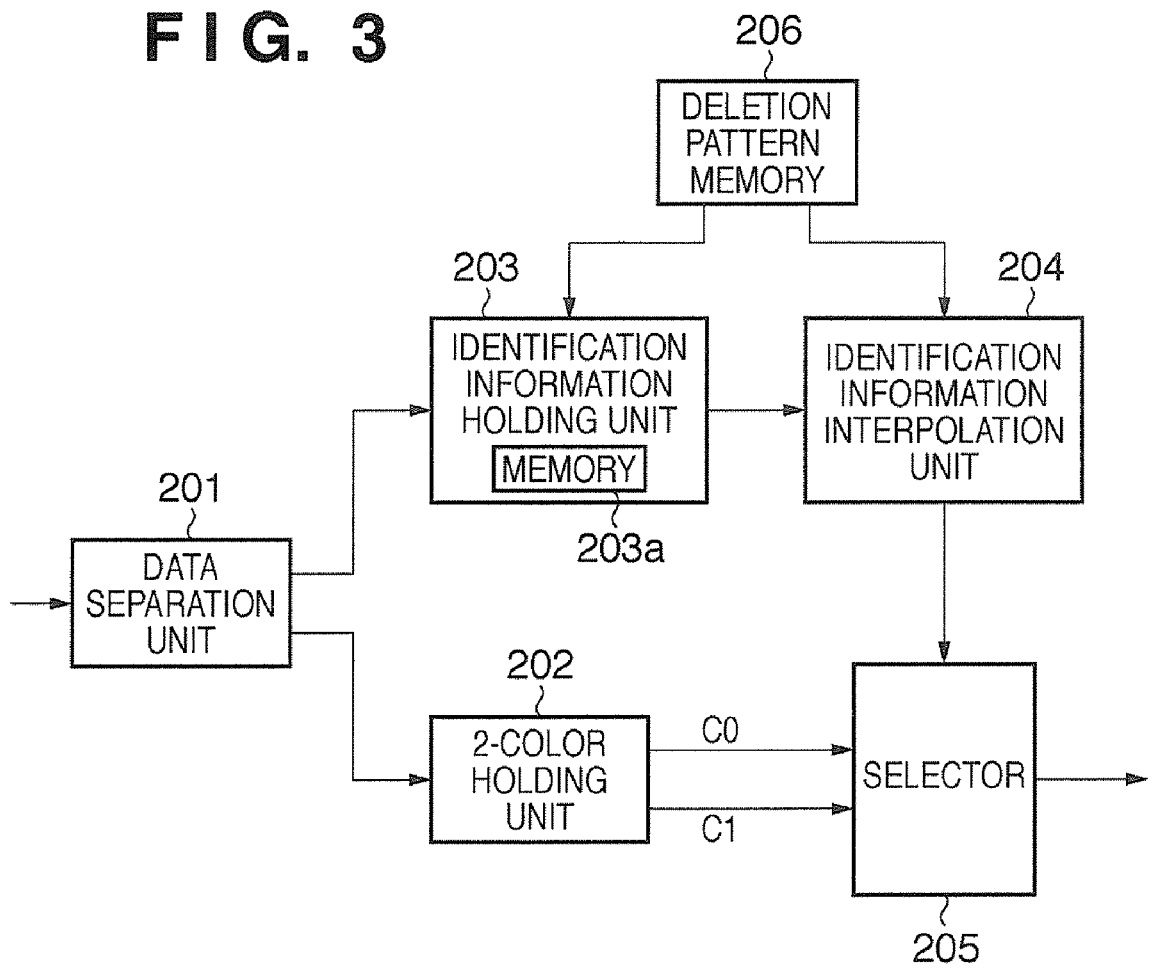
FIG. 3 is a block diagram of an image decoding apparatus in the first embodiment.
FIG. 4 illustrates positional relation between a pixel of interest X and peripheral pixels A to H upon interpolation of identification information by the image decoding apparatus.

Next, an image decoding apparatus in the present embodiment will be described. FIG. 3 is a block diagram of the image decoding apparatus according to the present embodiment. The image decoding apparatus has a data separation unit 201, a 2-color holding unit 202, an identification information holding unit 203, an identification information interpolation unit 204, a selector 205 and a deletion pattern memory 206.

The data separation unit 201 inputs fixed-length encoded data for 1 block (256 bits in the embodiment), as an input unit, from encoded image data, and outputs the head 16 bits, as the 8-bit 2 color data C0 and C1, to the 2-color holding unit 202. Further, the data separation unit 201 outputs 240 bit data from the 17th bit of the 1-block encoded data, as identification information, to the identification information holding unit 203.

The 2-color holding unit 202, having two 8-bit registers, separates the 16-bit data supplied from the data separation unit 201 into first half 8 bit data and last half 8 bit data, and holds these data in the 2 registers as the color data C0 and C1. The respective registers continuously output the color data C0 and C1 to the selector 205 by the completion of decoding processing for 16×16 pixels.

On the other hand, the identification information holding unit 203, having an internal memory 203a with a 16×16 bit capacity, stores the identification information supplied from the data separation unit 201 in the internal memory 203a. At this time, regarding the black portions of a deletion pattern (the same as the deletion pattern shown in FIG. 2) in the deletion pattern memory 206, appropriate dummy data (either of "0" or "1" may be used) is stored in the internal memory 203a. The dummy data is inserted such that the existing identification information indicates identification information in proper pixel positions.

The identification information interpolation unit 204 performs raster scanning on the identification information stored in the identification information holding unit 203, refers to the deletion pattern memory 106, and determines whether or not the identification information in a position of interest is dummy data. Then, if it is determined that the identification information in the position of interest is dummy data, the identification information interpolation unit 204 refers to peripheral existing identification information and generates by interpolation information, and outputs the generated information in place of the identification information in the position of interest inserted as dummy data.

Next, more particular processing by the identification information interpolation unit 204 will be described. As described above, the 16×16 bit identification information held in the identification information holding unit 203 is represented as I(x, y) using its coordinates (x, y). Further, the value of coordinates (x, y) in the deletion pattern (see FIG. 2) stored in the deletion pattern memory 206 is represented as D(x, y).

The identification information interpolation unit 204 inputs the identification information held in the identification information holding unit 203 in the order of raster scanning, and outputs the identification information under the following conditions.

When D(x, y)=0 holds, the identification information I(x, y) in the identification information holding unit 203 is outputted without any change.

When D(x, y)=1 holds, peripheral 8 items of information from the identification information I(x, y) (dummy data) are referred to, and interpolation processing is performed on the identification information I(x, y) in a position of interest (x, y), and the interpolation-generated information is outputted.

An example of the interpolation processing will be described below.

FIG. 4 illustrates the relation between a pixel position of interest X and positions of peripheral pixels A to H.

The identification information interpolation unit 204 of the present embodiment generates by interpolation identification information for the pixel of interest X using patterns in FIGS. 5A to 5L with respect to the position of the pixel of interest X.

In the respective patterns in FIGS. 5A to 5L, 2 hatched portions holding the pixel of interest X are defined. The 2 hatched portions are used as reference positions to generate identification information in the pixel position interest. Note that in the respective patterns in FIGS. 5A to 5L, white portions other than the hatched portions are not referred to.

In the present embodiment, when the identification information in the 2 reference positions are both "1" in any one of the patterns in FIGS. 5A to 5L, it is determined that the identification information in the pixel position of interest is "1".

For example, when the items of identification information immediately above and immediately below the position of the pixel of interest are both "1", the positional relation corresponds to the pattern in FIG. 5A. Accordingly, it is determined that the identification information in the pixel position of interest is "1". When it is determined that the positional relation corresponds to none of the patterns in FIGS. 5A to 5L, it is determined that the identification information in the pixel position of interest is "0".

To execute the above processing, the identification information interpolation unit 204 in the present embodiment calculates the identification information in the pixel position of interest X using the following logical operation.

$$X=B*G+D*E+C*F+A*H+B*H+B*F+E*F+A*E+D*H+C*D+C*G+A*G$$

("*" is a logical product (AND) of bits, and "+", a logical sum (OR) of bits)

The identification information positioned on the border of the deletion pattern is not deleted since the processing is based on the presumption that the identification information exists in peripheral 8 positions of the pixel position of interest as shown in the matrix in FIG. 4. Further, on this presumption, the deletion positions (black portions in FIG. 2) are arranged, with a distance of one or more pixels, from each other.

The identification information interpolation unit 204 generates by interpolation the identification information in the order of raster scanning as described above, and outputs the identification information to the selector 205.

When the identification information from the identification information interpolation unit 204 is "0", the selector 205 selects and outputs the color data C0 from the 2-color holding unit 202. When the identification information is "1", the selector 205 selects and outputs the color data C1 from the 2-color holding unit 202.

The processing by the image encoding apparatus and the processing by the decoding apparatus in the present embodiment are as described above.

In the case of an image mainly including a character or line art image, it is rare that the identification information "0" and "1" occur at random, since that pixels representing a character or line art portion are often continuous pixels and pixels representing the background are often continuous pixels.

Accordingly, there is a high probability that the identification information generated by interpolation using the patterns in FIGS. 5A to 5L from the deleted identification information is the same as the identification information generated by the identification information detection unit 103 in the image encoding apparatus (FIG. 1). Accordingly, even when 16 items of identification information are deleted from 16×16 items of identification information as in the case of the present embodiment, the influence on the entire information can be reduced, and it is possible to generate encoded data with access-advantageous fixed length of 256 bits (an integral multiple of 32).

Note that in the present embodiment, the identification information holding unit 203 in the decoding apparatus inserts dummy data, however, the insertion of dummy data is not necessarily required. In such cases, when dummy data is not inserted, in each deletion position, the identification information interpolation unit 204 changes a pixel position for reference by logical operation from the deletion pattern and performs the logical operation.

Further, the decoding apparatus in the present embodiment performs interpolation operation using the patterns in FIGS. 5A to 5L, however, the accuracy can be further increased by interpolation operation in accordance with the following algorithm. Hereinbelow, the algorithm will be described.

First, when the pixel position of interest is an interpolation position, the number of "1" and the number of "0" in the peripheral 8 items of identification information are calculated. Then, a smaller one of the number of "1" and the number of "0" is taken into consideration.

Figure 12:
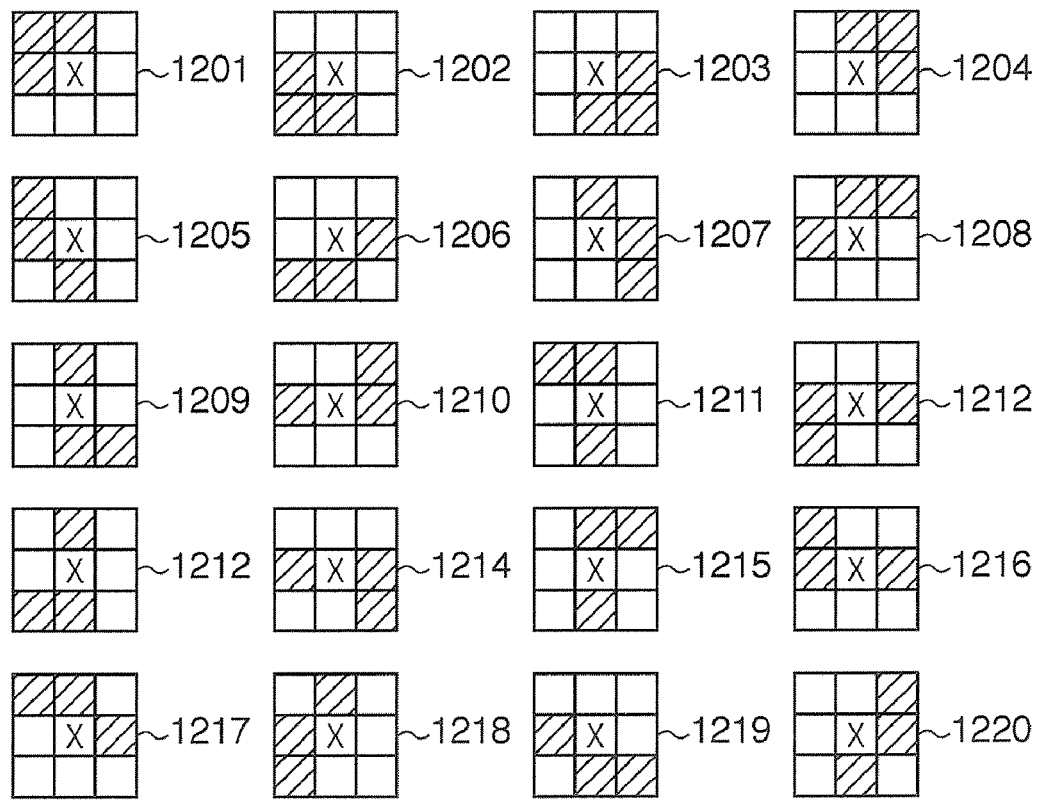
FIG. 12 illustrates reference patterns used by the image decoding apparatus upon decoding.
Figure 13:
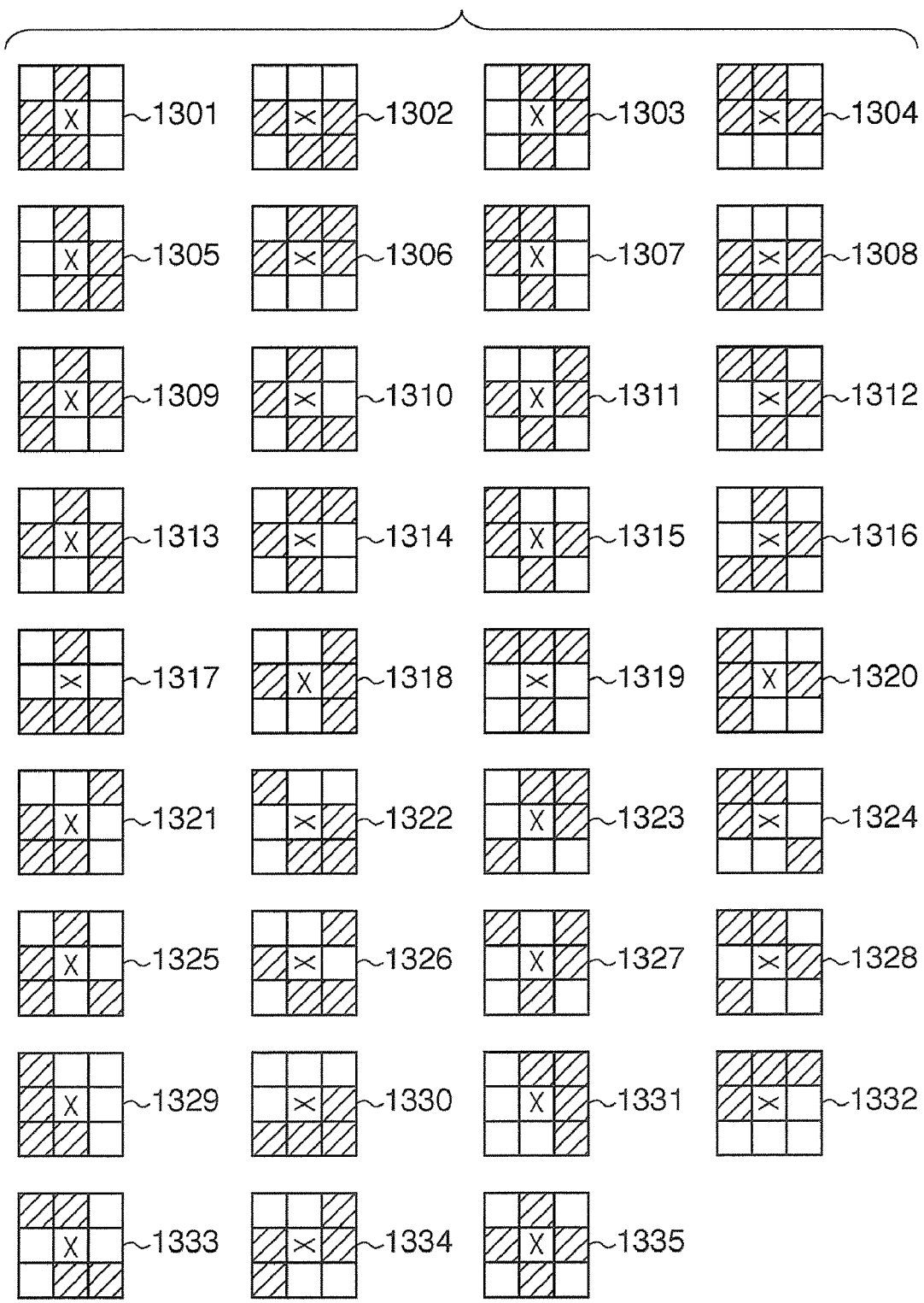
FIG. 13 illustrates reference patterns used by the image decoding apparatus upon decoding.

FIGS. 12 and 13 illustrate the pixel position of interest X and peripheral 8 items of identification information. In the figures, hatched pixels indicate fewer pixels in the 8 items of identification information. For example, in the 8 items of identification information, when the number of "1" is 3 and the number of "0" is 5, hatched portions indicate the identification information "1", while white portions, "0". Further, when the number of "1" is 5 and the number of "0" is 3, hatched portions indicate the identification information "0", while the white portions, "1". Note that when the number of "1" is 4 and the number of "0" is 4, hatched portions indicate the identification information "1", while white portions, "0".

Accordingly, the smaller number of values in the peripheral 8 pixels of a pixel of interest is 0 to 4. Regarding this number, the identification information of the pixel of interest X is determined as follows.

When the number of hatched portions in peripheral 8 pixels is 0 or 1:

The identification information of the pixel of interest X corresponds to the identification information indicated with the white portions.

When the number of hatched portions in peripheral 8 pixels is 2:

When the positional relation corresponds to any one of the patterns in FIGS. 5A to 5L, the identification information of the pixel of interest X corresponds to the identification information indicated with hatched portions.

When the number of hatched portions in peripheral 8 pixels is 3:

When the positional relation corresponds to any one of the patterns 1201 to 1220 in FIG. 12, the identification information of the pixel of interest X corresponds to the identification information indicated with hatched portions. When the positional relation corresponds to none of the patterns 1201 to 1220 in FIG. 12, the identification information of the pixel of interest X corresponds to the identification information indicated with white portions.

When the number of hatched portions in peripheral 8 pixels is 4:

When the positional relation corresponds to any one of the patterns 1301 to 1335 in FIG. 13, the identification information of the pixel of interest X corresponds to the identification information indicated with hatched portions. When the positional relation corresponds to none of the patterns 1301 to 1335 in FIG. 13, the identification information of the pixel of interest X corresponds to the identification information indicated with white portions.

Note that the interpolation patterns shown in FIGS. 12 and 13 may be referred to by using a table or may be calculated as functions using logical operation.

Modification to First Embodiment

Next, an example in which the above-described first embodiment is realized with a computer program executed by a general information processing apparatus such as a personal computer will be described below. As the information processing apparatus such as a personal computer has general constituent elements such as a CPU, a ROM, a RAM, a keyboard, a mouse, a hard disk and a display unit (including display controller), explanations of these constituent elements will be omitted. Note that the information processing apparatus is connected to an image input device such as an image scanner. Further, an application program and the deletion pattern (FIG. 2) to be described below are stored in the hard disk, and are read to the RAM and executed by the CPU.

Figure 10:
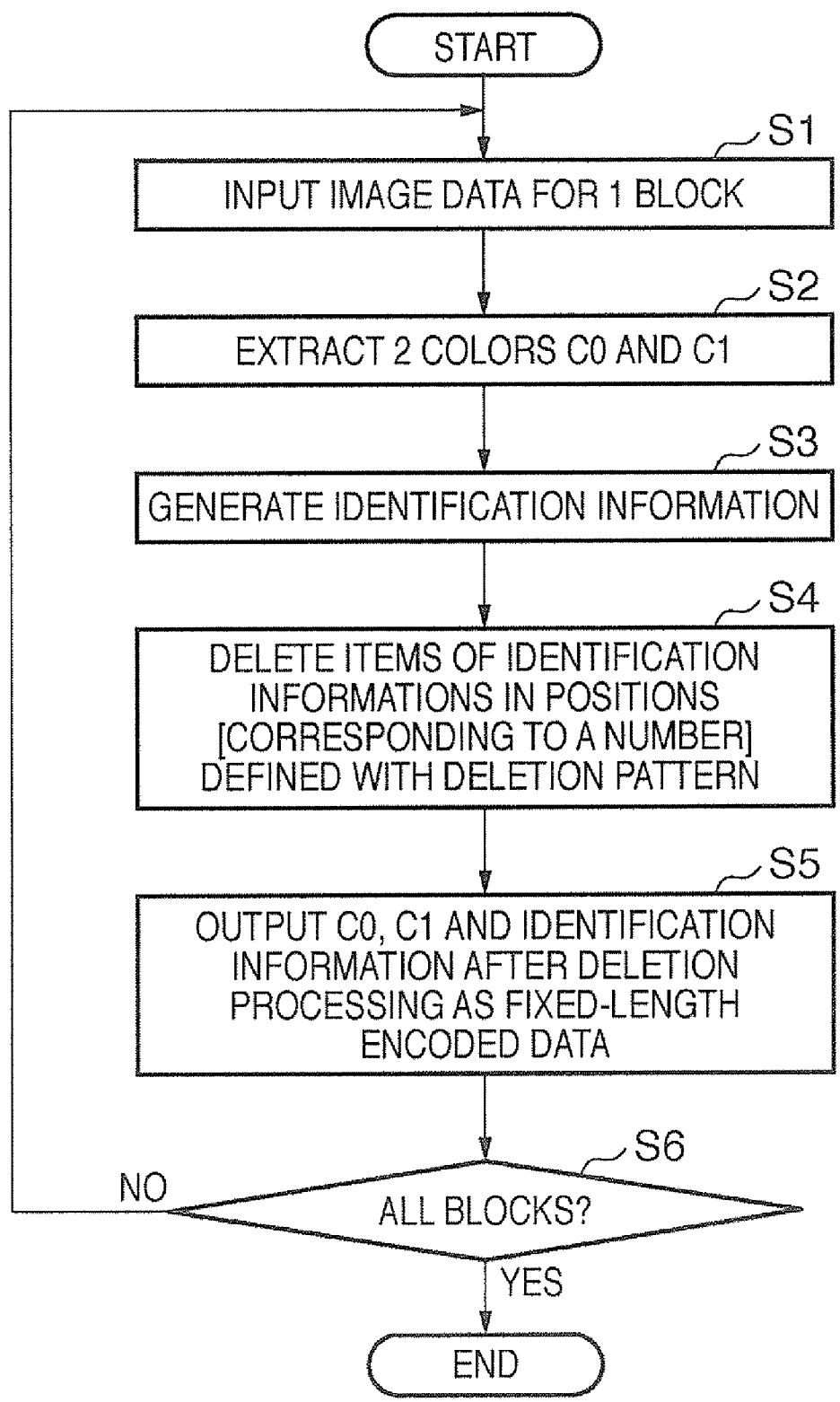
FIG. 10 is a flowchart showing an encoding processing procedure when encoding processing in the first embodiment is realized with a computer program.

FIG. 10 is a flowchart showing a processing procedure performed by the CPU when the information processing apparatus functions as an image encoding apparatus by execution of an encoding application. Note that in the following description, encoded data is outputted to the hard disk, i.e., the encoded data is stored as a compressed file.

First, at step S1, the CPU inputs image data for one 16×16 pixel block. Then at step S2, the CPU extracts 2 representative colors C0 and C1 from the image data. The algorithm to extract the representative colors C0 and C1 is as described above. Next, at step S3, the CPU generates identification information for each pixel in the block of interest as a pixel approximate to the color C0 or C1. Then at step S4, the CPU refers to the deletion pattern in FIG. 2, deletes the identification information in the deletion positions and the number, and thereby reduces the 256-bit identification information to 240-bit identification information. Thereafter, the process proceeds to step S5, at which the CPU combines the extracted colors C0 and C1 with the deletion-processed 240-bit identification information to 1 data, and outputs the data as fixed length (256 bit) encoded data of the block of interest. The process proceeds to step S6, at which the CPU determines whether or not the encoding processing on all the blocks has been completed. When the encoding processing has not been completed, the CPU repeats the processing from step S1. When it is determined that the encoding processing on all the blocks has been completed, the CPU terminates the encoding processing. Note that upon reading of image data from the image scanner, the number of blocks is uniquely determined based on the size of original and the reading resolution. At step S6, the determination is made based on the number of blocks.

Figure 11:
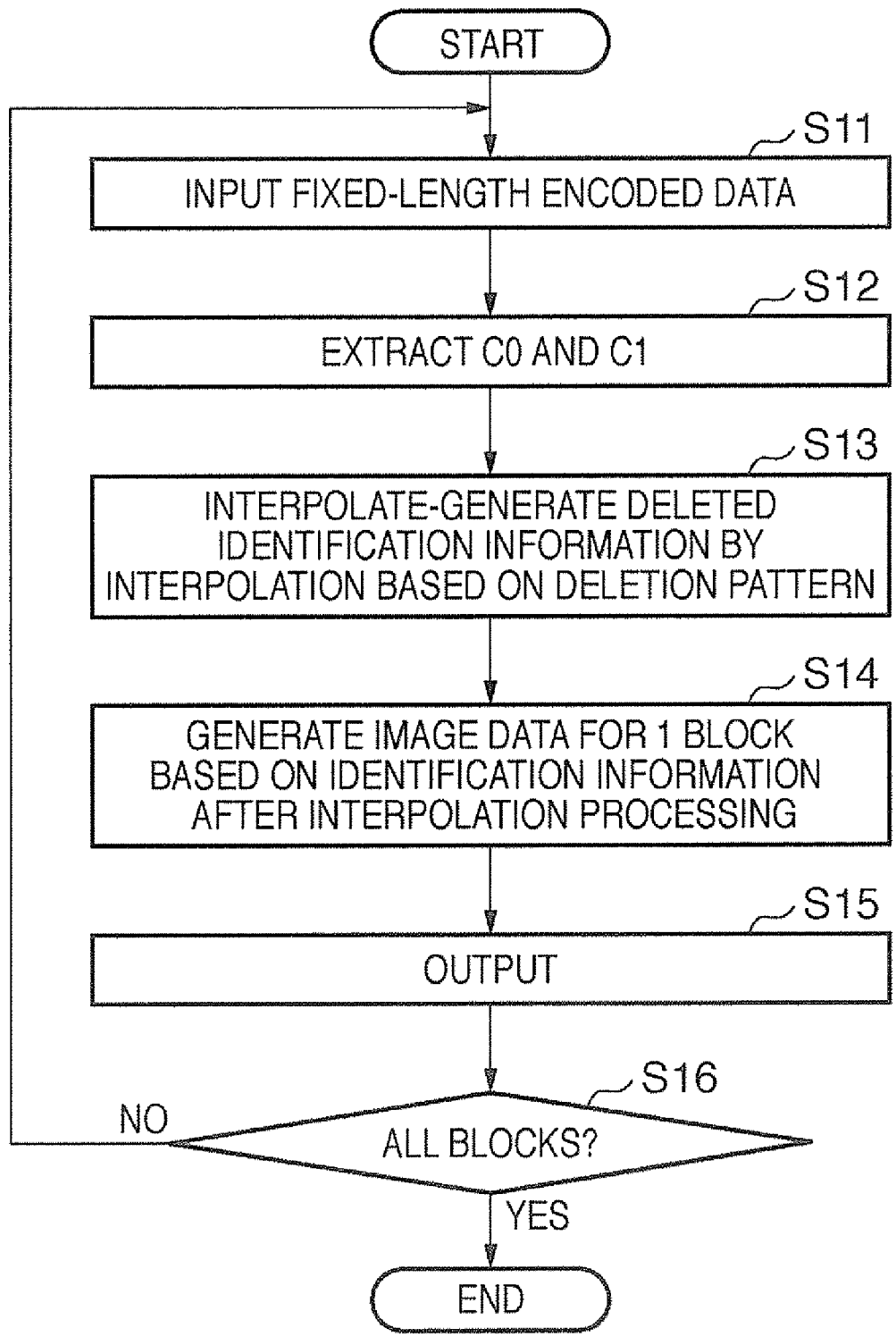
FIG. 11 is a flowchart showing a decoding processing procedure when decoding processing in the first embodiment is realized with a computer program.

Next, a procedure of execution of a decoding application will be described in accordance with the flowchart of FIG. 11. In the decoding application, a user has already designated an encoded file stored in the hard disk using a pointing device such as a mouse, and the result is outputted to the display unit (video memory).

First, at step S11, the CPU inputs fixed length (256 bit) encoded data from an encoded data file designated by the user. Then at step S12, the CPU extracts head 16 bits of the encoded data as the representative colors C0 and C1 (both 8 bits). Then the process proceeds to step S13, at which the CPU refers to the deletion pattern (see FIG. 2) previously stored in the hard disk, and interpolates the respective deleted items of identification information in the 240-bit identification information following the 2 representative color data, using the patterns in FIGS. 5A to 5L. As a result, 256 (16×16) bit identification information is generated. At step S14, the CPU performs processing to convert a pixel value in a position indicated with the generated identification information "0" to C0, and a pixel value in a position indicated with the generated identification information "1" to C1, and thereby generates 16×16 pixel image data. Thereafter, the process proceeds to step S15, at which the CPU outputs the generated image data for 1 block to the video memory. Then the process proceeds to step S16, at which the CPU determines whether or not the decoding processing on all the blocks has been completed. When the decoding processing on all the blocks has not been completed, the CPU repeats the processing from step S11. Further, when it is determined that the decoding processing on all the blocks has been completed, the CPU terminates the decoding processing.

As described above, processing similar to the processing in the above-described first embodiment can be realized with computer programs, and a similar advantage can be obtained.

Second Embodiment

In the above-described first embodiment and its modification, 1 deletion pattern shown in FIG. 2 is used in the image encoding apparatus and the decoding apparatus. Normally, it is preferable that the difference between the number of items of identification information interpolation-generated by the identification information interpolation unit 204 in FIG. 3 and the number of items of identification information generated by the identification information detection unit 103 in FIG. 1 is as small as possible.

In the second embodiment, plural deletion patterns are used, and encoding is performed using an optimum deletion pattern.

For the sake of simplification of explanation, as the deletion patterns in the second embodiment, 4 types of patterns (patterns 0 to 3) shown in FIGS. 6A to 6D are previously stored in the deletion pattern memory 106. As one deletion pattern is finally used, 2-bit information to specify an employed pattern (deletion pattern specifying information) is required. The values 0 to 3 represented with the 2-bit information correspond to the patterns 0 to 3 in FIGS. 6a to 6D.

Further, the 2 color data C0 and C1 are both 8 bit data. Accordingly, the number of necessary bits for the deletion pattern specifying information and the 2 color data C0 and C1 is 2+8+8=18 bits. Assuming that the fixed length of encoded data is 256 bits, 18 bits is deleted from the 256-bit identification information. Accordingly, 18 black portions exist in the respective patterns 0 to 3 in FIGS. 6A to 6D.

In the second embodiment, the apparatus configuration is the same as that in FIG. 1, however, the processing by the identification information deletion unit 104 and the processing by the packing unit 105 are different from those in the first embodiment.

Figure 6A:
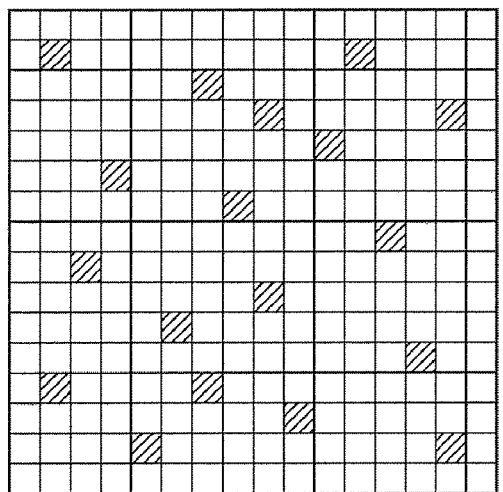
FIGS. 6A to 6D are examples of 4 deletion patterns in a second embodiment of the present invention.

The identification information deletion unit 104 deletes the 18 (18 bit) items of identification information using the deletion pattern 0 in FIG. 6A, and generates interpolated identification information from the deleted identification information using the patterns in FIGS. 5A to 5L. That is, the identification information deletion unit 104 performs similar processing to the processing by the identification information interpolation unit 204 in the decoding apparatus described in the first embodiment.

In the present embodiment, in the identification information generated by the identification information detection unit 103, the items of identification information before deletion in the deletion positions (black portions) indicated with the deletion pattern 0 in FIG. 6A are represented as I(0) to I(17). Then 18 positional information items obtained by interpolation using the patterns in FIGS. 5A to 5L are represented as I'(0) to I'(17).

The identification information deletion unit 104 counts the number of positions where I(i)=I'(i) (i=0 to 17) holds. The count value indicates the number of items of information properly restored among the 18 items of identification information in the decoding apparatus or an index value.

Figure 6B:
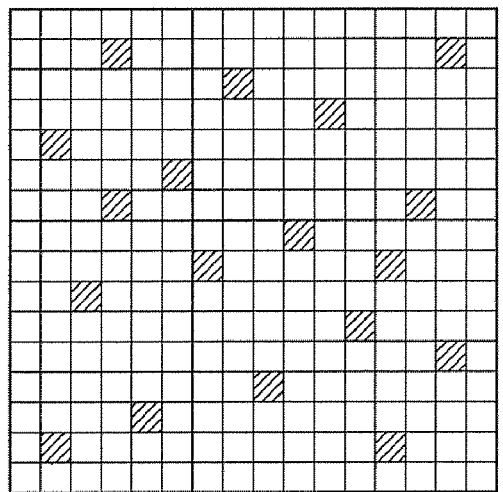
Figure 6C:
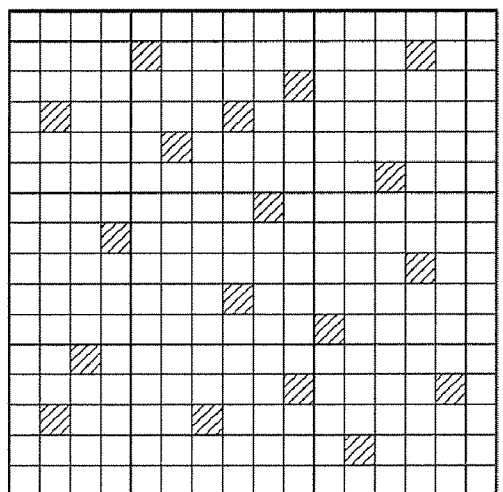
Figure 6D:
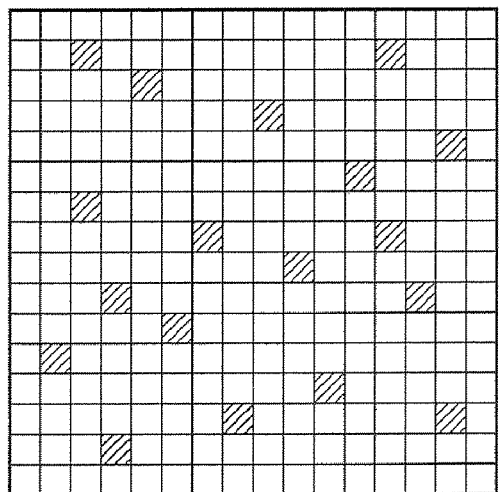

Then the identification information deletion unit 104 similarly calculates index values regarding the deletion patterns 1 to 3 in FIGS. 6B to 6D. Then the identification information deletion unit 104 determines one pattern with a maximum index value among the 4 deletion patterns 0 to 3. The identification information deletion unit 104 outputs the deletion pattern specifying information (2 bits) specifying the determined deletion pattern and the identification information (238 bits) after deletion processing using the determined deletion pattern, to the packing unit 105.

The packing unit 105 packs the deletion pattern specifying information (2 bits) notified from the identification information deletion unit 104, the color data C0 and C1 (8×2 bits), and the deletion-processed identification information (238 bits), in this order, and outputs them as encoded data of a block of interest.

On the other hand, the decoding apparatus performs the following processing. Note that the apparatus configuration is the same as that shown in FIG. 3 except that the 4 patterns 0 to 3 in FIGS. 6A to 6D are selectively stored in the deletion pattern memory 206.

First, the data separation unit 201 determines one of the deletion patterns 0 to 3 specified with the 2 bits of encoded data for 1 block. Then the data separation unit 201 outputs a determination result, i.e., a selection signal indicating the determined one of the 4 deletion patterns 0 to 3 stored in the deletion pattern memory 206, to the identification information holding unit 203 and the identification information interpolation unit 204. Further, the data separation unit 201 stores 16 bit data from the 3rd bit from the head, as the representative colors C0 and C1, in the 2-color holding unit 202.

The identification information holding unit 203 and the identification information interpolation unit 204 perform processing using one deletion pattern according to the selection signal in the deletion pattern memory 206. As the processing by the identification information holding unit 203 and the identification information interpolation unit 204 are the same as those in the first embodiment, explanations of the processing will be omitted. Further, the image decoding processing is the same as that in the first embodiment.

As described above, according to the second embodiment, the accuracy of identification information decoded by the decoding apparatus can be increased by using plural deletion patterns. As a result, the reproducibility of character or line art images or the like can be further improved.

Third Embodiment

In the third embodiment, plural interpolation methods (algorithms) are prepared, and an interpolation method by which the change between original identification information and interpolated identification information is minimum is selected. For example, there are 4 types of interpolation methods, 2 bits are required for discrimination of the interpolation methods. Further, assuming that one deletion pattern is employed, 2+8+8=18 bits (including bits of the 2 color data) are used in the interpolation method specifying information and the color data. That is, in the 16×16 items of identification information, 18 items of identification information are deleted.

Figures 7, 8:
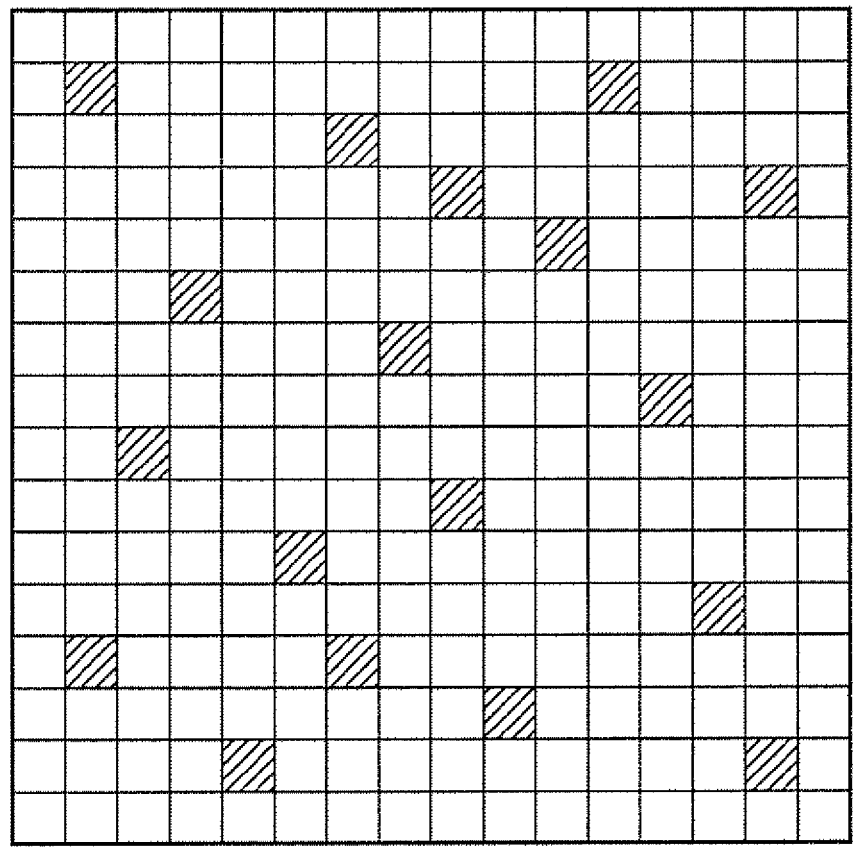
FIG. 7 is an example of the deletion pattern in a third embodiment of the present invention.
FIG. 8 illustrates type-based reference pixel positions in interpolation processing in the third embodiment.
Figure 9A:
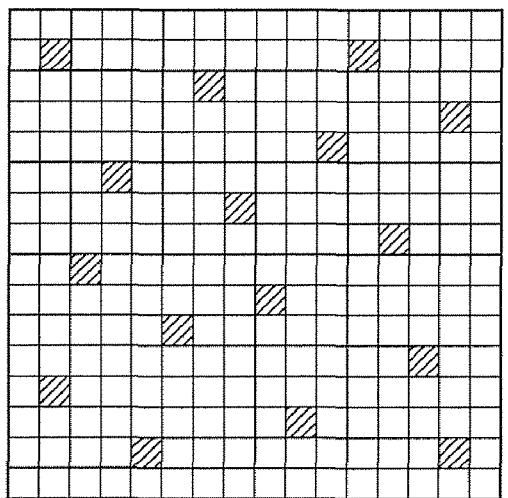
FIGS. 9A to 9D are examples of the 4 deletion patterns in a fourth embodiment of the present invention.
Figure 9B:
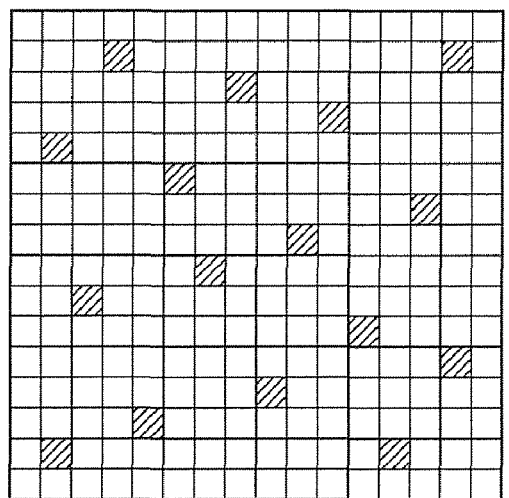
Figure 9C:
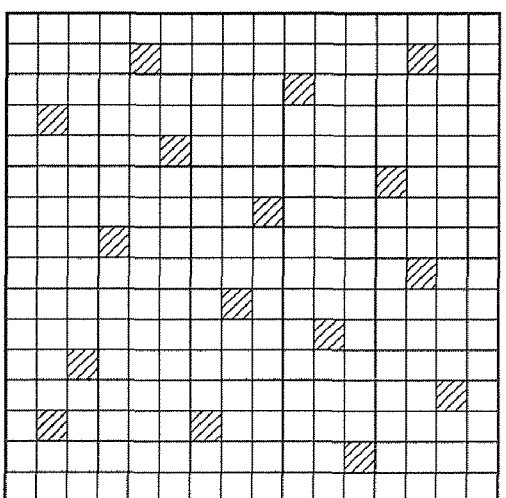
Figure 9D:
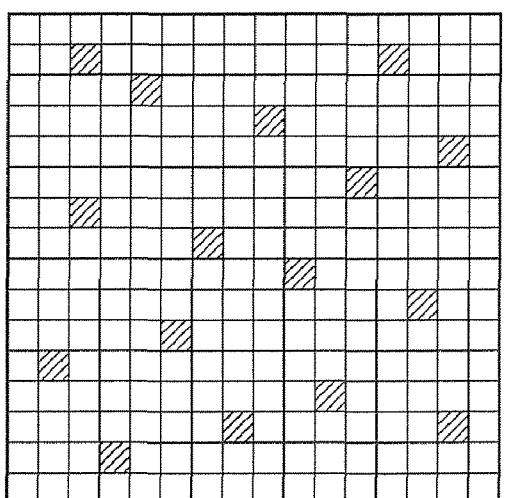

FIG. 7 shows an example of the deletion pattern according to the third embodiment. In the figure, no deletion position is provided on the border, however, as it is apparent from an interpolation algorithm to be described later, a deletion position may be provided in the lowest line.

Next, the interpolation of the deletion-processed identification information in the present embodiment will be described. FIG. 8 shows a position referred to for interpolation of deleted identification information in accordance with plural interpolation methods. In the figure, numerals 0 to 3, corresponding to interpolation methods 0 to 3, indicate one of peripheral 4 items of information used for interpolation of deleted identification information of interest X.

For example, when the interpolation method 0 is designated, as deleted identification information in the pixel position of interest, its left identification information is selected and outputted. Further, when the interpolation method 1 is designated, as deleted identification information in the pixel position of interest, its immediately above identification information is selected and outputted. Further, when the interpolation method 2 is designated, as deleted identification information in the pixel position of interest, its upper left identification information is selected and outputted. Further, when the interpolation method 3 is designated, as deleted identification information in the pixel position of interest, its upper right identification information is selected and outputted. In this manner, as the identification information on the lower side from the pixel position of interest is not referred to but already-interpolated position is referred to, even when a deletion position exists in the lowest line of 16×16 items of identification information, no problem occurs.

In the present embodiment, in the 16×16 items of identification information in 1 block, the items of identification information are deleted in 18 positions indicated as black portions in FIG. 7.

Note that in the positional information generated by the identification information detection unit 103, the items of identification information before deletion in the deletion positions (black portions) indicated with the deletion pattern in FIG. 7 are represented as I(0) to I(17). In the deleted identification information, 18 positional information items obtained by the interpolation method 0 are represented as I'(0) to I'(17).

The identification information deletion unit 104 counts the number of positions where I(i)=I'(i)(=0 to 17) holds. The count value is an index value indicating the number of items of information properly restored among the 18 items of identification information in the decoding apparatus.

Then the identification information deletion unit 104 similarly calculates index values regarding the other interpolation methods 1 to 3. Then the identification information deletion unit 104 determines one of the 4 interpolation methods with a maximum index value, and outputs information specifying the determined interpolation method (2 bits) and deletion-processed identification information (238 bits) to the packing unit 105.

The packing unit 105 packs the interpolation method specifying information (2 bits) notified from the identification information deletion unit 104, the color data C0 and C1, and the deletion-processed identification information (238 bits) in this order, and outputs them as encoded data of the block of interest.

On the other hand, the decoding apparatus performs processing as follows. The decoding apparatus has the same configuration as that shown in FIG. 3.

First, the data separation unit 201 determines one of the interpolation method 0 to 3 specified with the head 2 bits of encoded data for 1 block. Then the data separation unit 201 outputs a determination result, i.e., information specifying an interpolation method, to the identification information interpolation unit 204. Further, the data separation unit 201 stores the following 16 bit data, as the 2 representative colors C0 and C1, in the 2-color holding unit 202. Regarding deleted identification information in the identification information holding unit 203, the identification information interpolation unit 204 interpolate-outputs identification information in a designated interpolation direction as identification information in the pixel position of interest.

As described above, according to the third embodiment, the same advantages to those in the second embodiment can be obtained.

Fourth Embodiment

In the fourth embodiment, the amount of deletion of identification information is reduced, based on the above-described second embodiment. In the second embodiment, in the 256-bit identification information for 1 block, 18 bits identification information (18 items of identification information) is deleted. In the fourth embodiment, 16 bit identification information is deleted.

For this purpose, in the fourth embodiment, the number of bits of the color data C0 and C1 is respectively reduced from 8 to 7 bits. That is, the number of bits of the deletion pattern specifying information and the color data C0 and C1 is 2+7+7=16. When the number of bits of the color data is reduced from 8 to 7 bits, to reduce the influence on a reproduced color, the LSBs are deleted from the respective colors C0 and C1.

FIGS. 9A to 9D are examples of the deletion patterns in the fourth embodiment. In FIGS. 6A to 6D, the number of deleted items of identification information is 18, while the number of deleted items of identification information in FIGS. 9A to 9D is 16.

As the algorithm to determine a deletion pattern to be used is the same as that in the second embodiment, a detailed description of the algorithm will be omitted.

On the other hand, the data separation unit 201 of the image decoding apparatus extracts 2 color data C0' and C1' (both 7 bits) and the deletion pattern specifying information from head 16 bits of encoded data for 1 block. Then the separation unit 201 restores the color data C0' and C1' to 8 bit data, and outputs the restored color data to the 2-color holding unit 202. To restore 7-bit data to 8-bit data, the color data C0' and C1' are shifted leftward by 1 bit, and an appropriate value (desirably an MSB value) is stored in the LSB positions. As the other operations are the same as those described in the second embodiment, the explanations thereof will be omitted.

As described above, according to the fourth embodiment, although the accuracy of the 2 colors C0 and C1 is decreased slightly, as the number of deleted items of identification information is smaller than that in the second embodiment, the reproducibility of character or line art image can be further improved.

Fifth Embodiment

Hereinbelow, a fifth embodiment of the present invention will be described in detail.

Note that in the fifth embodiment, a multi-valued image data in which 1 pixel is represented with plural bits is encoded by 8m×8n pixel block (m and n are integers greater than or equal to 1). Further, 1 pixel is represented with 8-bit (256 levels) gray scale data. In the embodiment, encoded data for 1 block is generated as L-bit fixed-length (L=16+8m×8n) data. Note that a color image has plural color components. In this case, the above-described fixed-length encoded data is generated by color component.

Figure 14:
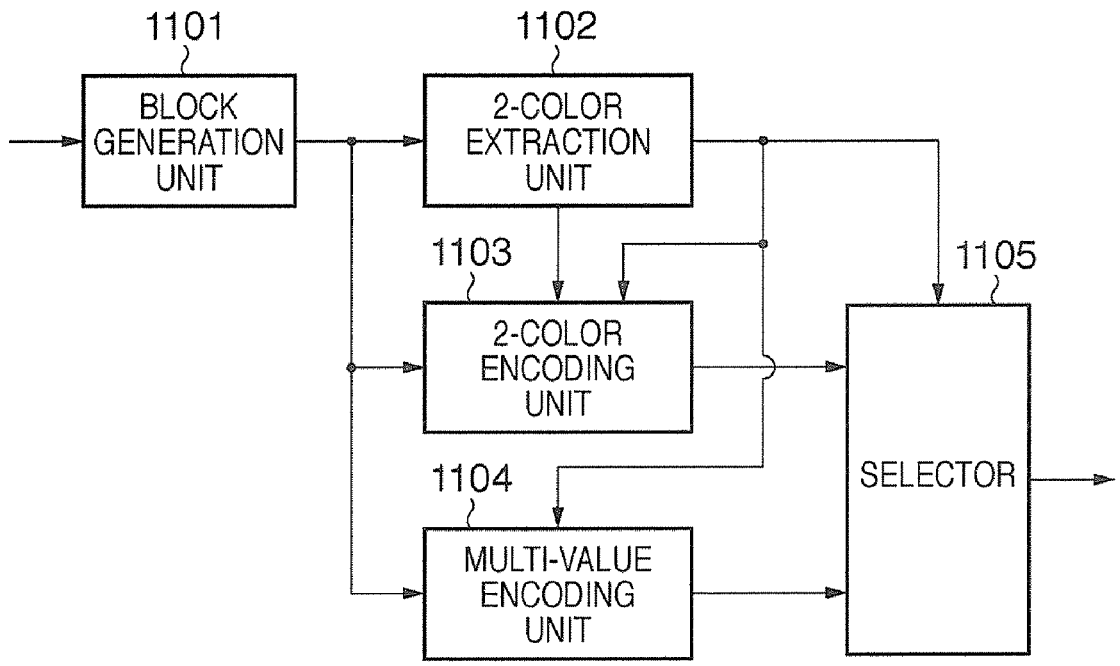
FIG. 14 is a block diagram of the image encoding apparatus in a fifth embodiment of the present invention.

FIG. 14 is a block diagram of the image encoding apparatus in the fifth embodiment. The image encoding apparatus has a block generation unit 1101, a 2-color extraction unit 1102, a 2-color encoding unit 1103, a multi-value encoding unit 1104, and a selector 1105.

The block generation unit 1101 inputs 8m×8n pixel partial image data (hereinbelow, block data) from image data to be encoded. Note that in the embodiment, the source of the image data to be encoded is an image scanner, however, the source may be a storage device storing non-compressed image data. The type of source is not limited. Further, for the sake of simplification of explanation, the size of the block is 8×8 pixels (m=n=1). Accordingly, in the following description, the fixed length of encoded data for 1 block is 16+8×8=80 bits. Although the details will be apparent from the following description, the head 1 bit of the fixed-length 80 bit data indicates the type of encoding. Accordingly, the remaining 79 bits become a capacity for storing encoded data for 1 block.

The 2-color extraction unit 1102 extracts the 2 representative colors (or representative values) C0 and C1 from the input block data. More particularly, the 2-color extraction unit 1102 calculates the average value AVE of respective pixel values in the block. Then, the 2-color extraction unit 1102 classifies the pixel values into a pixel group where the pixel values are less than or equal to the calculated average value AVE (first group) and a pixel group where the pixel values are greater than the average value AVE (second group). Then the 2-color extraction unit 1102 calculates an average value of the pixels belonging to the first group, and determines the average value as the representative color C0. Similarly, the 2-color extraction unit 1102 calculates an average value of the pixels belonging to the second group, and determines the average value as the representative color C1. Then the 2-color extraction unit 1102 outputs the determined representative colors C0 and C1 and the average value AVE to the 2-color encoding unit 1103.

Further, the 2-color extraction unit 1102 compares the difference D between the representative colors C0 and C1 (D=C1−C0) with a predetermined threshold Th (Th>1), and outputs the result of comparison as a determination signal (1 bit) to the 2-color encoding unit 1103, the multi-value encoding unit 1104 and the selector 1105. Note that when D>Th holds, the determination signal is "1", while when D≦Th holds, the determination signal is "0".

When the determination signal is "1", the 2-color encoding unit 1103 performs encoding processing. On the other hand, when the determination signal is "0", the multi-value encoding unit 1104 performs encoding processing. When the determination signal is "1", the selector 1105 selects encoded data generated by the 2-color encoding unit 1103 and outputs the selected encoded data. When the determination signal is "0", the selector 1105 selects encoded data generated by the multi-value encoding unit 1104 and outputs the selected encoded data. Note that as the selector 1105 selects one of the encoded data in accordance with the determination signal, it may be arranged such that the 2 encoding units perform encoding processing regardless of the determination signal.

The multi-value encoding unit 1104 utilizes well-known lossy JPEG encoding. That is, the multi-value encoding unit 1104 performs DCT transformation, quantization, entropy encoding (encoding a DC component then AC components).

In the fifth embodiment, encoded data for 1 block is converted to "80" fixed-length bit data. Further, in the fifth embodiment, as 2 types of encoding methods are used, it is necessary to indicate the type of encoded data. Accordingly, the multi-value encoding unit 1104 adds coding type information (1 bit) indicating that the encoded data has been generated by the multi-value encoding unit 1104, and then outputs 79-bit encoded data. The 2-color encoding unit 1103 adds also coding type information indicating the encoded data has been by the 2-color encoding unit.

Note that the selector 1105 selects the encoded data generated by the multi-value encoding unit 1104 when the determination signal is "0". That is, in this case, the difference D between the representative colors C0 and C1 of each pixel within a block of interest is less than or equal to the threshold (D≦Th). D≦Th holds when the block of interest includes few or no high frequency components such as a character or line art image. Accordingly, the respective transformation coefficients for AC components upon DCT transformation are small values, and almost all the DCT transformation coefficients are quantized to "0". Therefore the amount of encoded data from the multi-value encoding unit 1104 is sufficiently small.

Actually the amount of encoded data varies in correspondence with the value of the threshold Th. However, as long as the threshold Th is set to an appropriate value or less value, when encoded data from the multi-value encoding unit 1104 is selected, the amount of the encoded data can be within the fixed length. Note that the amount of encoded data can be obtained when encoding processing is actually performed. Accordingly, when the number of bits of generated encoded data is smaller than 79, the multi-value encoding unit 1104 adds dummy bits including an EOB code to the end of the encoded data.

Further, when the number of bits of encoded data generated by the multi-value encoding unit 1104 is larger than 79, the multi-value encoding unit 1104 outputs 79 bit data from the head as a result of encoding. The data following the 79 bit data is deleted, however, such deletion is performed in rare cases. If such deletion is performed, as the deleted data is high-frequency component data, the influence on image quality is small.

Figure 15:
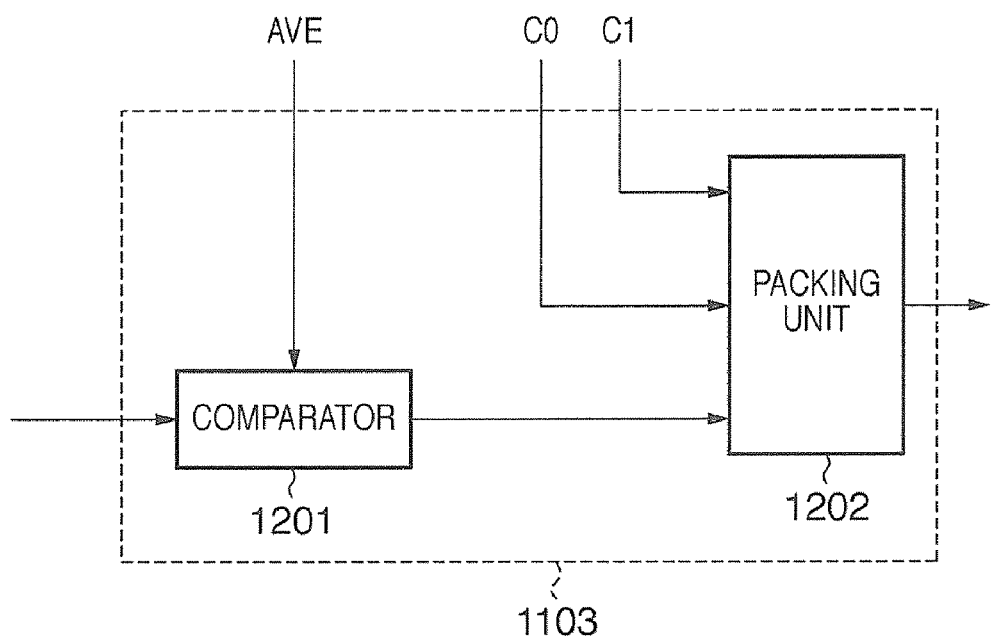
FIG. 15 is a block diagram of a 2-color encoding unit in FIG. 14.

Next, the 2-color encoding unit 1103 in the fifth embodiment will be described. FIG. 15 is a block diagram of the 2-color encoding unit 1103. The 2-color encoding unit 1103 has a comparator 1201 and a packing unit 1202.

The comparator 1201 performs raster scanning on block data from the block generation unit 1101 and inputs image pixels by 1 pixel. Then the comparator 1201 compares the input pixel value of interest with the average value AVE from the 2-color extraction unit 1102. The comparator 1201 outputs a binary signal, which is "0" when the pixel value of interest is less than or equal to the average value AVE while "1" when the pixel value of interest is greater than the average value AVE, to the packing unit 1202. That is, the comparator 1201 functions as an identification information generation unit to generate identification information (binary) to identify each pixel as a pixel belonging to the above-described first group or second group in the 2-color extraction unit 1201. Accordingly, the data generated by the comparator 1201 is also referred to as identification information as in the case of the first embodiment. In the fifth embodiment, as 1 block has 8×8 pixels, the number of bits of the identification information is 8×8=64.

The packing unit 1202 combines the representative colors C0 and C1 to the identification information and outputs the combined data. Note that as the representative colors C0 and C1 are both 8-bit data, when they are simply combined, the number of bits is 8×2+64=80, over the 79 bit capacity excluding 1 bit to indicate the type of encoding.

The packing unit 1202 in the fifth embodiment operates as follows, to represent the 2 colors C0 and C1 are represented with 15 bits. Note that as already described above, C0<C1 holds. Further, in the representative color C0, a value represented with bits 1 to 7 except the LSB (bit 0) is C0', and in the representative color C1, a value represented with bits 1 to 7 except the LSB (bit 0) is C1'. The data C0 is shifted in a lower bit direction by 1 bit, then data C0' (similarly C1') can be easily generated by using bits 0 to 6. That is, assuming that "+" indicates bit combining, the data array is as follows.

When bit 0 of the representative color C1 is "0": bit 0 of representative color C0+C0'+C1'

When bit 0 of the representative color C1 is "1": bit 0 of representative color C0+C1'+C0'

FIGS. 16A and 16B illustrate data structures of encoded data generated by the 2-color encoding unit 1103 including encoding type information (1 bit), color information and identification information (64 bits). Although the details of decoding processing will be described later, respectively 8-bit representative colors C0 and C1 can be restored from the encoded data. In the encoded data, the first value of the 2 representative colors respectively represented with 7 bits is data V0, and the next data is V1. When V0<V1 holds, as the order of the representative colors in the encoded data, the color C0 and then the color C1 are positioned. This uniquely corresponds to the case of FIG. 16A. That is, the original 8-bit representative color C1 can be restored by shifting the 7-bit representative color C1 leftward (high-order bit direction) by 1 bit and setting "0" as the LSB. Further, the representative color C0 can be restored by simply shifting the representative color C0 leftward by 1 bit and setting the 2nd bit of the encoded data (bit 0 of C0) as the LSB.

Further, when V0>V1 holds, as the order of the representative colors respectively represented with 7 bits in the encoded data, the color C1 and then the color C0 are positioned. This uniquely corresponds to the case of FIG. 16B. That is, the original 8-bit representative color C1 can be restored by shifting the 7-bit representative color C1 leftward (high-order bit direction) by 1 bit and setting "1" as the LSB. Further, the representative color C0 can be restored by simply shifting the representative color C0 leftward by 1 bit and setting the 2nd bit of the encoded data (bit 0 of C0) as the LSB.

As described above, the 2 representative colors can be restored by comparison between the data V0 and V1 and in accordance with the array of the data.

Note that V0=V1 holds only when the representative color C0 is an even number value (the LSB is 0) and the representative color C1 is greater than the representative color C0 by "1" (the LSB is 1). In other words, V0=V1 holds only when the representative color C0 is an even number value and the representative color C1 is greater than the representative color C0 by "1". In this situation, as the second bit (bit 0 of C0) of the encoded data is "0" and V0=V1 holds, V0 (or V1) is shifted in the higher-order bit direction by 1 bit and "0" is set as the LSB, thereby the color C0 can be obtained. Further, the color C1 can be obtained by adding "1" to the color C0.

Further, in the present embodiment, the data structure of encoded data generated by the 2-color encoding unit 1103 corresponds to FIG. 16A or 16B. However, the present invention is not limited to this arrangement. For example, it may be arranged such that the identification information (64 bits), then {C0', C1'}, and the LSB of one of the representative colors are set in this order. Any data structure may be employed as long as it is common to the encoding apparatus side and the decoding apparatus side.

As described above, upon packing of 16 bits representing the 2 representative colors and 64 bits representing the identification information, the 2-color encoding unit 1103 in the fifth embodiment can generate encoded data in which the number of bits is smaller than 16+64 by 1 bit. As resolutions of recent image scanners and digital cameras are becoming higher, the number of blocks is being increased. Accordingly, decrement by 1 bit per 1 block means greatly reducing the amount of encoded data for an entire image.

Further, when the image encoding apparatus has a configuration without the multi-value encoding unit 1104 of the fifth embodiment, 1 pixel is not necessarily represented with 8 bits and 1 block is not necessarily constituted by 8m×8n pixels as well as 1 block includes plural pixels. Further, the coding type information is not necessary.

Further, as in the case of the above-described fifth embodiment, when the 2-color encoding unit 1103 and the multi-value encoding unit 1104 are used and image data where 1 pixel is represented with 8 bits is encoded by 8×8 pixel block, 80-bit fixed length encoded data can be generated for 1 block. Further, as the 1 block data is represented with an integral multiple of 8, i.e., an integral multiple of 1 byte, access efficiency can be increased.

Note that in the above-described embodiment, a monochrome multi-valued image is handled, however, the present invention may be applied to a color image. In a color image where R, G and B components are respectively represented with 8 bits, the processing in the above-described embodiment is performed by color component.

Further, in the embodiment, the coding type information is generated by the respective encoding units, however, it may be arranged such that the selector 1105 adds the coding type information based on information from the 2-color extraction unit.

Figure 17:
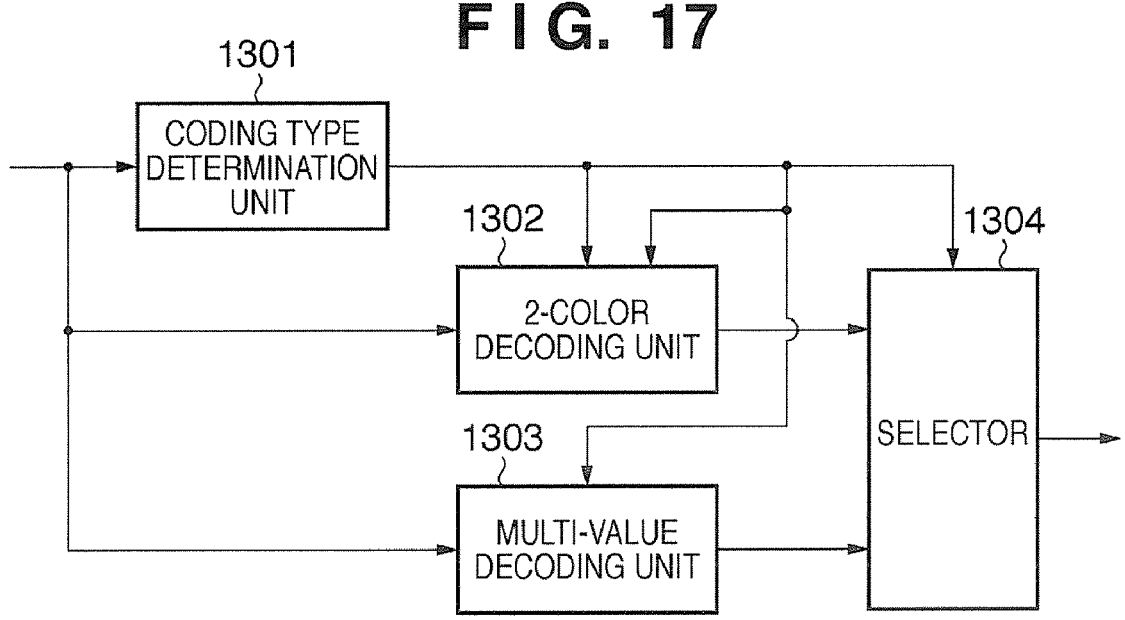
FIG. 17 is a block diagram showing the image decoding apparatus in the fifth embodiment.

Next, the image decoding apparatus in the fifth embodiment will be described. FIG. 17 is a block diagram showing the image decoding apparatus in the fifth embodiment. The image decoding apparatus has a coding type determination unit 1301, a 2-color decoding unit 1302, a multi-value decoding unit 1303 and a selector 1304.

The coding type determination unit 1301 determines whether the head 1 bit (coding type information) of the 80-bit encoded data is "0" or "1". In other words, the coding type determination unit 1301 determines whether encoded data of interest is generated by the 2-color encoding unit 1103 or the multi-value encoding unit 1104. The coding type determination unit 1301 outputs the result of determination, as a control signal, to the 2-color decoding unit 1302, the multi-value decoding unit 1303 and the selector 1304.

When the control signal from the coding type determination unit 1301 indicates that encoded data has been generated by the 2-color encoding unit 1103, the 2-color decoding unit 1302 decodes the encoded data of interest as 2-color encoded data.

The 2-color decoding unit 1302 determines whether the input encoded data corresponds to FIG. 16A or 16B. That is, the 2-color decoding unit 1302 compares the values of the 2 representative colors respectively represented with 7 bits, determines the types of the respective colors as FIG. 16A or 16B, and restores the 8-bit representative colors C0 and C1.

The algorithm for restoration is as described above. Then, assuming that the following 64-bit identification information is arrayed in the order of raster scanning, the 2-color decoding unit 1301 outputs the representative color C0, to a pixel position in which the identification information is "0", as its pixel value. The 2-color decoding unit 1301 outputs the representative color C0, to a pixel position in which the identification information is "1", as its pixel value. The output is performed regarding the 64 bits, thereby 8×8 pixel image data can be restored.

On the other hand, when the control signal from the coding type determination unit 1301 indicates that the encoded data has been generated by the multi-value encoding unit 1104, the multi-value decoding unit 1303 JPEG-decodes the encoded data of interest as multi-valued encoded data. The decoding processing is performed as entropy decoding, inverse quantization, and inverse DCT transformation in this order. At this time, as a result of entropy decoding of 79 bit data following the coding type information, when an EOB (End Of Block) has been detected, data following the EOB is ignored as dummy data. Further, when the EOB has not been detected in the entropy decoding processing, it is determined that the number of missing DCT coefficients after quantization is "0", and the decoding processing is continued.

When the control signal from the coding type determination unit 1301 indicates that the encoded data has been generated by the 2-color encoding unit 1103, the selector 1304 selects and outputs 8×8 pixel data from the 2-color decoding unit 1302. On the other hand, when the control signal from the coding type determination unit 1301 indicates that the encoded data has been generated by the multi-value encoding unit 1104, the selector 1304 selects and outputs 8×8 pixel data from the multi-value decoding unit 1303. This operation is repeated, thereby image restoration (decoding) is performed.

As described above, the 2-color decoding unit 1302 of the fifth embodiment inputs data by 15+64 bits, determines the 2 representative colors C0 and C1, and restores encoded data for one 8×8 pixel block.

Note that in a decoding apparatus having only the 2-color decoding unit 1302, 79 bits of data will suffice for 1 block. That is, generally, when 1 pixel is represented with M bits and encoded data for m×n pixel block is obtained, the amount of 1 block encoded data (data length) is 2M−1+m×n bits.

Further, according to the present embodiment, encoded data including multi-valued encoded data and 2-color encoded data generated by the above-described encoding apparatus can be decoded.

Note that when the data length of 1 block encoded data is an integral multiple of 8, the size of 1 block is 8n×8m pixels. Further, the fixed code length when the size of 1 block is 8n×8m pixels is L. The multi-value encoding unit 1104 performs JPEG encoding on 8×8 pixels m×n times on the assumption that the block includes n×m sub blocks each having 8×8 pixels. At this time, the encoding is performed such that as the fixed length of JPEG encoded data for 1 sub block, L/(m×n)−1 holds, and as the fixed length of JPEG encoded data for other sub block, L/(m×n) holds.

Further, in the embodiment, bit 0 of the color C0 is stored after the coding type information, however, bit 0 of the color C1 may be stored. In this case, the order of the colors C0 and C1 is determined in correspondence with bit 0 of the color C0.

Further, the fifth embodiment may be combined with any of the above-described first to fourth embodiments.

Modification to Fifth Embodiment

Next, an example in which similar processing to that in the above-described fifth embodiment is realized with a computer program will be described below. As the computer program may be executed by e.g. a personal computer and the computer has as its hardware resources a CPU, a ROM, a RAM, an HDD, a display unit (display controller), and an image input unit (image scanner), explanations of these elements will be omitted. Hereinbelow, a processing procedure by an application program to perform encoding and decoding will be described in accordance with the drawings.

Figure 18:
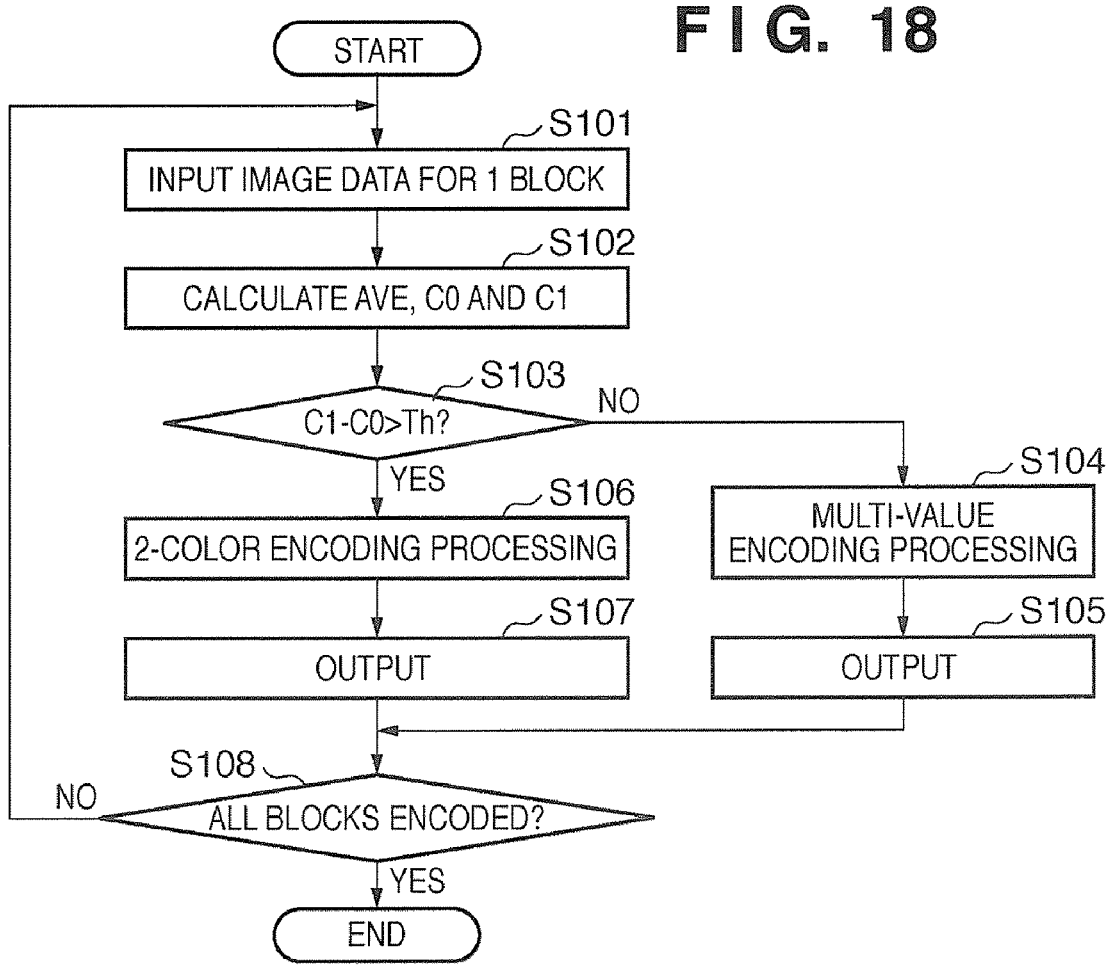
FIG. 18 is a flowchart showing the encoding processing procedure in a modification to the fifth embodiment.

First, an encoding processing procedure in the application program executed by the CPU will be described in accordance with the flowchart of FIG. 18. Note that the application program is stored in a storage medium such as a hard disk, and is loaded to the RAM and executed by the CPU under the control of an OS (Operating System). Further, the source of image data to be encoded is not particularly limited, however, the source is an image scanner in this example. The result of encoding is stored as a file in the hard disk.

First, at step S101, the CPU inputs image data to be encoded for 1 block (8×8 pixels). Then at step S102, the CPU calculates the average value AVE of pixels in the input block. Then the CPU calculates an average value of a pixel group having values less than or equal to the average value AVE as the representative color C0, and calculates an average value of a pixel group having values greater than the average value AVE as the representative color C1. At this time, when all the pixels in the block have the same pixel value, C0=C1 holds.

At step S103, the CPU determines whether "C1−C0" is greater than the threshold Th. When it is determined that "C1−C0" is less than or equal to the threshold Th, i.e., the block of interest includes a smaller number of high frequency components, the process proceeds to step S104. At step S104, the CPU performs multi-value encoding (JPEG encoding), adds 1 bit data indicating the multi-value encoding to the head of encoded data, and generates 79-bit encoded data following the 1 bit data. Thereafter, the CPU outputs generated with 80-bit fixed-length encoded data (multi-valued encoded data) at step S105.

On the other hand, at step S103, when the CPU determines that "C1−C0" is greater than the threshold value Th, it can be determined that the block of interest includes a character or line art image. Then the process proceeds to step S106, at which the CPU performs 2-color encoding processing. That is, the CPU generates 1 bit data indicating the 2-color encoding, bit 0 of the color C0, and higher-order 7 bits of the colors C0 and C1 in the order corresponding to the value of the bit 0 of the color C1. Then the CPU compares the average value AVE calculated at step S102 with each pixel value in the block, and generates identification information indicating one of the 2 groups to which the pixel belongs. Then the CPU combines these data to construct the data structure as shown in FIG. 16A or 16B.

Thereafter, at step S107, the CPU outputs the constructed data.

Upon completion of processing at step S105 or S107, the process proceeds to step S108, at which the CPU determines whether or not the encoding processing on all the blocks has been completed. When it is determined that the encoding processing has not been completed, the processing is repeated from step S101.

When it is determined at step S108 that the encoding processing on all the blocks has been completed, the CPU terminates the encoding processing.

Figure 19:
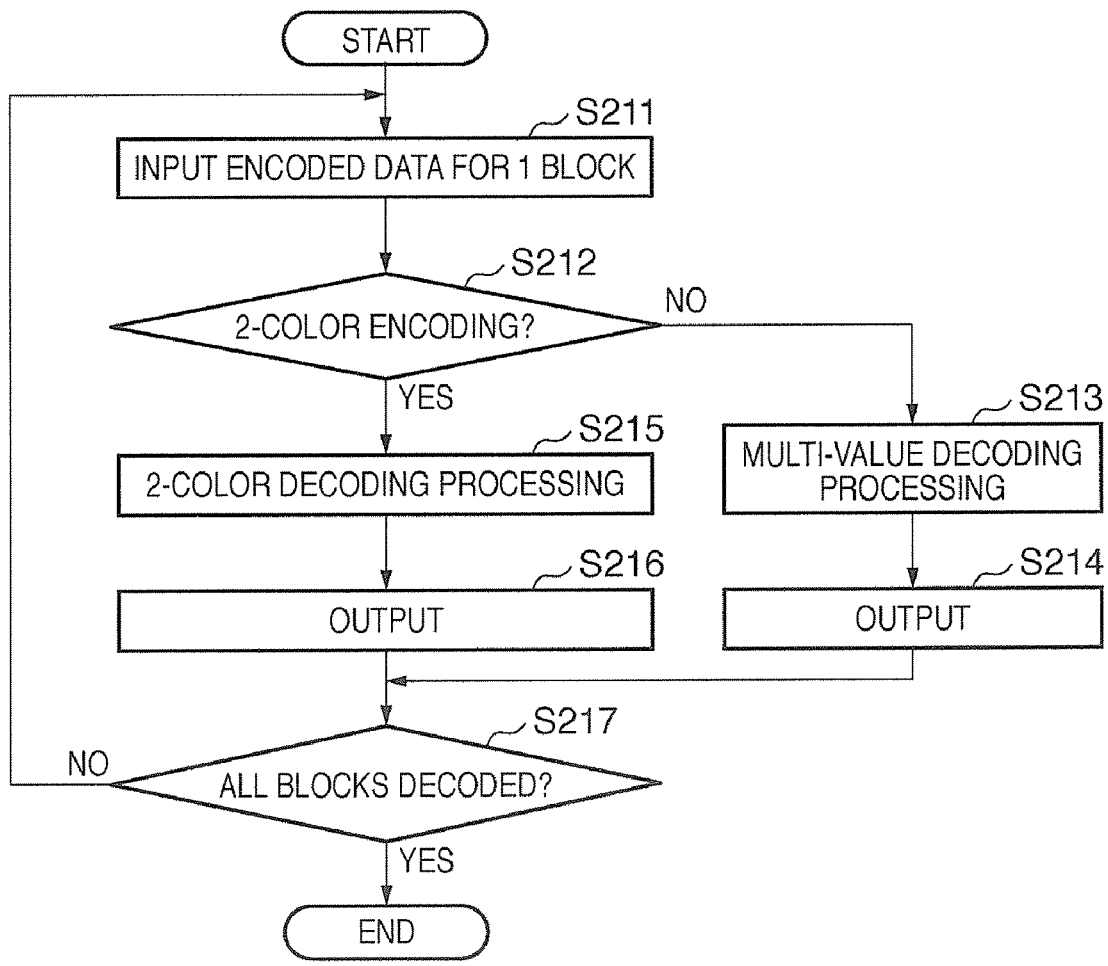
FIG. 19 is a flowchart showing the decoding processing procedure in another modification to the fifth embodiment.

Next, the decoding processing by the application program executed by the CPU will be described in accordance with the flowchart of FIG. 19. In this case, a compression-encoded data file stored in the hard disk (already selected by the user via a GUI) is decoded and displayed. Since the result of decoding is displayed, the output destination of decoded image data is a video memory included in the display controller.

First, at step S211, the CPU inputs encoded data for 1 block (with 80-bit fixed length) from the encoded data file into the RAM. Next, at step S212, the CPU determines whether the head 1-bit coding type information is "0" or "1". That is, the CPU determines whether the input encoded data is 2-color encoded data or multi-valued encoded data.

When it is determined that the input encoded data is multi-valued encoded data, the process proceeds to step S213, at which the CPU performs JPEG decoding processing. The decoding processing is performed as well-known entropy decoding, inverse quantization, and inverse DCT transformation, in this order. Note that, when an EOB has been detected as a result of sequential entropy decoding of 79 bits except the coding type information, data following the EOB is ignored as dummy data. Further, when the EOB has not been detected in the entropy decoding processing, it is determined that the number of missing DCT coefficients after quantization is "0", and the decoding processing is continued. When 8×8 pixel block image data is decoded, then at step S214, the CPU outputs the block image data.

On the other hand, when it is determined that the input encoded data is 2-color encoded data, the process proceeds to step S215. At step S215, the CPU determines whether the input encoded data corresponds to FIG. 16A or FIG. 16B. That is, the CPU compares the values of the respectively 7-bit 2 representative colors, and determine the types of the representative colors as FIG. 16A or FIG. 16B. Then the CPU decodes the 8-bit representative colors C0 and C1. Then, on the assumption that the following 64-bit identification information is arrayed in the order of raster scanning, the CPU replaces data in a pixel position where the each identification information is "0" with the representative color C0 as its pixel value. The CPU replaces data in a pixel position where the identification information is "1" with the representative color C1 as its pixel value. This processing is performed for 64 bits, thereby 8×8 pixel image data is restored. Thereafter, at step S216, the CPU outputs the restored 8×8 pixel image data.

When the processing at step S214 or S216 has been completed, the process proceeds to step S217, at which the CPU determines whether or not the decoding processing on all the blocks has been completed. When it is determined that the decoding processing on all the blocks has not been completed, the CPU repeats the processing from step S211.

As described above, the encoding processing and decoding processing can be realized by computer programs, and similar advantages to those in the above-described embodiment can be obtained.

Sixth Embodiment

In the fifth embodiment and its modification, as a reference for selecting one of the 2 encoded data, the relation between the difference between the representative colors C0 and C1 and the threshold Th is used, however, the present invention is not limited to this arrangement.

For example, an error between the result of decoding of 2-color encoded data and original 8×8 pixel image data, and an error between the result of decoding of multi-valued encoded data and the original 8×8 pixel image data, are obtained. Then, encoded data with smaller error is determined as encoded data to be outputted. The details are as follows. Note that the apparatus configuration is the same as that shown in FIG. 14. The block generation unit 1101 in the present embodiment outputs 8×8 pixel image data also to the selector 1105. Further, the selector 1105 has a function of decoding encoded data from the 2-color encoding unit 1103 and decoding encoded data from the multi-value encoding unit 1104. Further, the selector 1105 a function described below.

In the present embodiment, in original 8×8 pixel image data (image data to be encoded), each pixel value is defined as $X(i,j)$ ($i,j=0, 1, 2, \ldots 7$). Further, in 8×8 pixel image data decoded from 2-color encoded data, each pixel value is defined as $Y(i, j)$. Further, in 8×8 pixel image data decoded from multi-valued encoded data, each pixel value is defined as $Z(i,j)$. The selector 1105 calculates errors D1 and D2 in accordance with the following expressions.

$$D1=\Sigma|X(i,j)-Y(i,j)|$$

$$D2=\Sigma|X(i,j)-Z(i,j)|$$

Note that $|p|$ indicates the absolute value of a value p, and $\Sigma$, integration of i, j=0 and j=0, 1, ... 7. Further, in place of calculation of the absolute value of difference between pixels, sum of squares of the difference between pixels may be obtained as follows.

$$D1=\Sigma\{X(i,j)-Y(i,j)|\}^2$$

$$D2=\Sigma\{X(i,j)-Z(i,j)|\}^2$$

(P^2 means square of P)

In any case, when $D1 \leq D2$ holds, the selector 1105 selects the 2-color encoded data, while when $D1>D2$ holds, the selector 1105 selects the multi-valued encoded data.

Further, when all the pixels in the block of interest have the same value, the 2-color extraction unit 1102 determines one of the 2 representative colors C0 and C1 as an existing color, and the other one as dummy data. Then the 2-color extraction unit 1102 outputs the central value of as the average value AVE to the 2-color encoding unit 1103. An example of this arrangement is as follows.

In this example, the values of all the pixels in a block of interest are "255". The 2-color extraction unit 1102 determines that C0=255 (existing color) and C1=0 (dummy data), and outputs a central value "128' as the average value AVE to the 2-color encoding unit 1103. The 2-color encoding unit 1103 having the configuration shown in FIG. 15 determines the identification information for all the pixels as "1". This processing is noncontradictory and no problem occurs.

As described above, according to the sixth embodiment, in addition to the advantages in the first embodiment, encoded data for decoding an image more accurately approximate to an original image can be generated.

Note that the sixth embodiment may be combined with any of the above-described first to fourth embodiments.

The respective embodiment of the present invention have been described as above. As in the case of the above-described modifications to the first and fifth embodiments, processing corresponding to the other embodiments may be realized by computer programs read and executed by a computer. In this case, processing corresponding to each processing unit may be realized as a function or subroutine of the computer program.

Further, generally, a computer program is stored in a computer-readable storage medium such as a CD-ROM. The storage medium is set in a computer-readable device (CD-ROM drive or the like) and duplicated or installed in a system, thereby the computer program becomes executable. Therefore, such computer-readable storage medium is included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-163015, filed Jun. 20, 2007 and 2007-163016, filed Jun. 20, 2007, which are hereby incorporated by reference herein in their entirety.

What is claimed is:

1. An image encoding apparatus for encoding plural block data each having m×n pixels, in multi-valued image data, and generating L-bit (L≦m×n) encoded data for each block data, comprising:
an input unit to input said block data;
an extraction unit to extract plural representative color information from the input block data;
a generation unit to generate identification information for identification of each pixel in said block data as a pixel corresponding to one of said plural representative color information; and
a deletion unit to refer to predetermined pattern data and to delete the identification information by a number of bits obtained by subtracting said L bits from a total number of bits of said plural representative color information and encoded data constituted by said identification information.

2. The apparatus according to claim 1, further comprising:
a storage unit to hold plural pattern data; and
a selection unit to select one of said plural pattern data held in said storage unit,
wherein said deletion unit deletes said identification information by using said pattern data selected by said selection unit.

3. The apparatus according to claim 1, wherein said L is an integral multiple of 32.

4. A control method for an image encoding apparatus for encoding plural block data each having m×n pixels, in multi-valued image data, and generating L-bit (L≦m×n) encoded data for each block data, comprising:
an input step of inputting said block data;
an extraction step of extracting plural representative color information from the input block data;
a generation step of generating identification information for identification of each pixel in said block data as a pixel corresponding to one of said plural representative color information; and
a deletion step of referring to predetermined pattern data and deleting the identification information by a number of bits obtained by subtracting said L bits from a total number of bits of said plural representative color information and encoded data constituted by said identification information.

5. An image encoding apparatus for encoding image data in which 1 pixel is represented with plural bits by m×n pixel block, and generating encoded data having a fixed length L which is less than or equal to m×n bits and an integral multiple of at least 32, for 1 block, comprising:
an input unit to input image data by said block;
an extraction unit to extract representative colors C0 and C1 from image data of the input block of interest;
a generation unit to generate 1-bit identification information to identify each pixel in the block of interest as a pixel approximate to one of said representative colors C0 and C1;
a storage unit to, when a number of bits necessary to specify at least said representative colors C0 and C1 is defined as N, hold pattern data for deletion of {m×n−L+N} items of identification information from the identification information for 1 block generated by said generation unit and for specifying pixel positions to be deleted away from each other by at least 1 pixel;
a deletion unit to refer to the pattern data held in said storage unit and to delete the {m×n−L+N} items of identification information from m×n bit identification information generated by the generation unit, thereby generate L−N bit identification information; and
an output unit to combine N bits including information to specify the representative colors C0 and C1 extracted by said extraction unit to the {L−N} bit identification information after deletion by said deletion unit, and output the result of combining as encoded data for the block of interest.

6. The apparatus according to claim 5, wherein said extraction unit calculates an average value AVE of pixel values in the block,
classifies the pixels in said block into a first group of pixels having pixel values less than or equal to said average value AVE and a second group of pixels having pixel values greater than said average value AVE,
and extracts an average value of pixel values belonging to said first group and an average value of pixel values belonging to said second group as said representative colors C0 and C1.

7. The apparatus according to claim 6, wherein, when the absolute value of the difference between said representative colors C0 and C1 is less than or equal to a predetermined threshold, said generation unit generates identification information indicating that all the pixels in the block belong to the representative color C0.

8. The apparatus according to claim 5, wherein said storage unit holds plural mutually-different pattern data,
and wherein said deletion unit deletes said identification information using the respective pattern data,
further wherein said apparatus further comprising:
a determination unit to calculate an index value indicating a ratio of correspondence between the result of interpolation of the deleted identification information and identification information in corresponding positions before deletion, by pattern data, and determine a pattern data with a maximum ratio of correspondence; and
a storage unit to store information to specify the pattern data determined by said determination unit in the number of bits N necessary to specify said representative colors C0 and C1.

9. The apparatus according to claim 5, further comprising:
a determination unit to obtain a ratio of correspondence between the deleted identification information and identification information before deletion in accordance with respective plural algorithms for interpolation and generation of the deleted identification information, and determine an algorithm for obtaining a maximum ratio of correspondence; and
a storage unit to store information to specify the pattern data determined by said determination unit in the number of bits N necessary to specify said representative colors C0 and C1.

10. The apparatus according to claim 5, wherein respective positions of items of identification information to be deleted in said pattern data are dispersed in a line direction and a column direction.

11. A control method for an image encoding apparatus for encoding image data in which 1 pixel is represented with plural bits by m×n pixel block, and generating encoded data having a fixed length L which is less than or equal to m×n bits and an integral multiple of at least 32, for 1 block, comprising:
- an input step of inputting image data by said block;
- an extraction step of extracting representative colors C0 and C1 from image data of the input block of interest;
- a generation step of generating 1-bit identification information to identify each pixel in the block of interest as a pixel approximate to one of said representative colors C0 and C1;
- a storage step of, when a number of bits necessary to specify at least said representative colors C0 and C1 is defined as N, holding pattern data for deletion of {m×n−L+N} items of identification information from the identification information for 1 block generated at said generation step and for specifying pixel positions to be deleted away from each other by at least 1 pixel;
- a deletion step of referring to the pattern data held at said storage step and deleting the {m×n−L+N} items of identification information from m×n bit identification information generated at the generation step, thereby generating L−N bit identification information; and
- an output step of combining N bits including information to specify the representative colors C0 and C1 extracted at said extraction step to the {L−N} bit identification information after deletion at said deletion step, and outputting the result of combining as encoded data for the block of interest.

12. A non-transitory computer readable medium storing a computer program for causing a computer to execute the method according to claim 11.

13. An image decoding apparatus for decoding encoded image data, encoded as encoded data having a fixed length L which is less than or equal to m×n bits and an integral multiple of at least 32, for m×n pixel block, comprising:
- a storage unit to hold pattern data to specify {m×n−L+N} pixel positions away from each other by 1 or more pixels in 1 block;
- an input unit to input L-bit encoded data for 1 block;
- an extraction unit to extract representative colors C0 and C1 of the block from head N bits of the input encoded data;
- a generation unit to input L−N bits following said N bits as identification information for pixels, refer to the pattern data held in said storage unit, and interpolate identification information in the {m×n−L+N} pixel positions indicated with the pattern data, thereby generate m×n bit identification information; and
- a decoding unit to select and output one of said representative colors C0 and C1 in correspondence with a value of each bit of the generated m×n bit identification information, thereby decode image data constituted by m×n pixels.

14. The apparatus according to claim 13, wherein said storage unit holds plural mutually-different pattern data,
and wherein said extraction unit further extracts specifying information to specify a pattern data from said head N bits,
further wherein said generation unit refers to the pattern data specified with the specifying information extracted by said extraction unit and interpolates the identification information.

15. The apparatus according to claim 13, wherein said generation unit interpolates the identification information for a pixel of interest in accordance with an interpolation operation determined in correspondence with a smaller number of items of identification information among items of identification information for peripheral pixels of the pixel of interest to be interpolated.

16. The apparatus according to claim 13, wherein said extraction unit further extracts specifying information to specify an algorithm for interpolation of the identification information by said generation unit from said head N bits,
and wherein said generation unit interpolates the identification information in accordance with the algorithm specified with the specifying information extracted by said extraction unit.

17. A control method for an image decoding apparatus for decoding encoded image data, encoded as encoded data having a fixed length L which is less than or equal to m×n bits and an integral multiple of at least 32, for m×n pixel block, comprising:
- an input step of inputting L-bit encoded data for 1 block;
- an extraction step of extracting representative colors C0 and C1 of the block from a head N bits of the input encoded data;
- a generation step of referring to pattern data to specify {m×n−L+N} pixel positions away from each other by 1 or more pixels in 1 block, held in a storage unit, and interpolate-generating deleted identification information in the {m×n−L+N} pixel positions in L−N bit identification information following said N bits, thereby generating m×n bit identification information; and
- a decoding step of selecting and outputting one of said representative colors C0 and C1 in correspondence with a value of each bit of the generated m×n bit identification information, thereby decoding image data constituted by m×n pixels.

18. A non-transitory computer readable medium storing a computer program for causing a computer to execute the method according to claim 17.

19. An image encoding apparatus for encoding multi-valued image data in which 1 pixel is represented with plural bits, comprising:
- an input unit to input image data by block constituted by plural pixels;
- an extraction unit to extract representative colors C0 and C1 in relation of C0<C1 from a block of interest;
- an identification information generation unit to generate binary identification information for identification of each pixel in the block of interest as a pixel belonging to one of said representative colors C0 and C1;
- a generation unit to generate a least significant bit of one of said representative colors C0 and C1 and data C0' and C1' except respective least significant bits of said representative colors C0 and C1; and
- an output unit to combine said generated least significant bit, said data C0' and C1' and said identification information as encoded data for said block of interest and output the encoded data,
wherein said output unit rearranges the order of said data C0' and C1' in said encoded data, to C0' and C1', or C1' and C0', in correspondence with a value of the least significant bit of the other one of said representative colors C0 and C1, and outputs the encoded data.

20. The apparatus according to claim 19, wherein said extraction unit calculates an average value AVE of pixel values in said block of interest, and assuming that a pixel group having values less than or equal to said average value AVE is a first group and a pixel group having values greater than said average value AVE is a second group, extracts an average value of the pixel values of said first group and an average value of the pixel values of said second group, as said representative colors C0 and C1.

21. The apparatus according to claim 19, wherein, when all the pixel values in said block of interest are the same, said extraction unit determines said pixel values as one representative color, and extracts a value of the other representative color as a dummy value different from said one representative color.

22. The apparatus according to claim 19, further comprising:
a JPEG encoding unit to, assuming that said block has 8m×8n (m and n are integers greater than or equal to 1) pixels and the number of bits of the encoded data outputted by said output unit is L, generate JPEG encoded data, in which JPEG encoded data for 1 sub block has a fixed length of L/(m×n)−1 and JPEG encoded data for the other sub blocks has a fixed length of L/(m×n), by performing JPEG encoding m×n times on sub blocks each having 8×8 pixels in said block of interest, thereby generate L−1 bit JPEG encoded data; and
a selection unit to select one of the encoded data outputted by said output unit and the JPEG encoded data generated by said JPEG encoding unit, and output the selected encoded data subsequently to 1-bit coding type information indicating that the selected encoded data is the encoded data outputted by said output unit or the JPEG encoded data generated by said JPEG encoding unit.

23. The apparatus according to claim 22, wherein said selection unit compares the difference between said representative colors C0 and C1 with a predetermined threshold, and when said difference is less than or equal to said threshold, selects the encoded data generated by said JPEG encoding unit, while when said difference is greater than said threshold, selects the encoded data outputted by said output unit.

24. The apparatus according to claim 22, wherein said selection unit calculates an error D1 between an image as a result of decoding of the encoded data generated by said JPEG encoding unit and an image of said block of interest before encoding,
calculates an error D2 between an image as a result of decoding of the encoded data outputted from said output unit and the image of said block of interest before encoding,
and wherein when D2≦D1 holds as relation between the errors, said selection unit selects the encoded data outputted by said output unit,
while when D2>D1 holds as relation between the errors, said selection unit selects the encoded data generated by said JPEG encoding unit.

25. A control method for an image encoding apparatus for encoding multi-valued image data in which 1 pixel is represented with plural bits, comprising:
an input step of inputting image data by block constituted by plural pixels;
an extraction step of extracting representative colors C0 and C1 in relation of C0<C1 from a block of interest;
an identification information generation step of generating binary identification information for identification of each pixel in the block of interest as a pixel belonging to one of said representative colors C0 and C1;
a generation step of generating a least significant bit of one of said representative colors C0 and C1 and data C0' and C1' except respective least significant bits of said representative colors C0 and C1; and
an output step of combining said generated least significant bit, said data C0' and C1' and said identification information as encoded data for said block of interest and outputting the encoded data,
wherein at said output step, the order of said data C0' and C1' in said encoded data is rearranged to C0' and C1', or C1' and C0', in correspondence with a value of the least significant bit of the other one of said representative colors C0 and C1, and the encoded data is outputted.

26. A non-transitory computer readable medium storing a computer program for causing a computer to execute the method according to claim 25.

27. An image decoding apparatus for decoding encoded data generated by an image encoding apparatus in claim 19, comprising:
an input unit to input encoded data by 1 block;
an extraction unit to extract 1-bit data, data V0 and V1 except least significant bits of representative colors C0 and C1 of the block, and identification information identifying each pixel in the block as a pixel belonging to one of said representative colors C0 and C1;
a representative color restoration unit to restore one of said representative colors C0 and C1 by adding said 1-bit data to a least significant bit of one of said data V0 and V1 determined by comparing said data V0 to said data V1, and restore the other one of said representative colors C0 and C1 in accordance with an order of values of said data V0 and V1; and
an image restoration unit to restore an image of the block constituted by plural pixels by selecting and outputting one of the representative colors C0 and C1 restored by said representative color restoration unit in accordance with a value of said identification information.

28. A control method for an image decoding apparatus for decoding encoded data generated by an image encoding apparatus in claim 19, comprising:
an input step of inputting encoded data by 1 block;
an extraction step of extracting 1-bit data, data V0 and V1 except least significant bits of representative colors C0 and C1 of the block, and identification information identifying each pixel in the block as a pixel belonging to one of said representative colors C0 and C1;
a representative color restoration step of restoring one of said representative colors C0 and C1 by adding said 1-bit data to a least significant bit of one of said data V0 and V1 determined by comparing said data V0 to said data V1, and restoring the other one of said representative colors C0 and C1 in accordance with an order of values of said data V0 and V1; and
an image restoration step of restoring an image of the block constituted by plural pixels by selecting and outputting one of the representative colors C0 and C1 restored by said representative color restoration unit in accordance with a value of said identification information.

29. A non-transitory computer readable medium storing a computer program for causing a computer to execute the method according to claim 28.

* * * * *